US012076291B2

(12) United States Patent
Farris et al.

(10) Patent No.: US 12,076,291 B2
(45) Date of Patent: Sep. 3, 2024

(54) REMOTE ACTUATION CONFIGURATION FOR POWERED ORTHOTIC DEVICES

(71) Applicant: Ekso Bionics Holdings, Inc., San Rafael, CA (US)

(72) Inventors: Ryan J. Farris, Solon, OH (US); Spencer A. Murray, Aurora, OH (US); Geoffrey W. Kennard, Cleveland, OH (US)

(73) Assignee: Ekso Bionics Holdings, Inc., San Rafael, CA (US)

( * ) Notice: Subject to any disclaimer, the term of this patent is extended or adjusted under 35 U.S.C. 154(b) by 980 days.

(21) Appl. No.: 17/051,556

(22) PCT Filed: Jul. 17, 2019

(86) PCT No.: PCT/US2019/042140
§ 371 (c)(1),
(2) Date: Oct. 29, 2020

(87) PCT Pub. No.: WO2020/028038
PCT Pub. Date: Feb. 6, 2020

(65) Prior Publication Data
US 2021/0228430 A1 Jul. 29, 2021

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0244* (2013.01);
(Continued)

(58) Field of Classification Search
CPC ...... A61H 3/00; A61H 1/0255; A61H 1/0266; A61H 2201/1215; A61H 2201/149;
(Continued)

(56) References Cited

U.S. PATENT DOCUMENTS 4,084,267 A * 4/1978 Zadina ...................... A61F 2/54 623/24
4,125,035 A * 11/1978 Dooley .................. B25J 9/0093 239/263.2

(Continued)

FOREIGN PATENT DOCUMENTS

CN 104068985 10/2014
CN 104188786 12/2014

(Continued)

OTHER PUBLICATIONS

English translation for CN 104825306, translated by Espacent.com.*

(Continued)

*Primary Examiner* — Tu A Vo
(74) *Attorney, Agent, or Firm* — Renner, Otto, Boisselle & Sklar, LLP

(57) ABSTRACT

An actuator system for an orthotic device includes an actuator assembly and a driven joint member connected remotely from the actuator assembly by flexible cabling to permit flexibility in positioning the driven joint member relative to the actuator assembly. The actuator system includes an actuator assembly having a motor and a first portion of a transmission assembly that provides a speed reduction of a motor speed to an output speed. The driven joint member has an output portion of the transmission assembly and a connector component for connecting the driven joint member to a brace component of the orthotic device. The driven joint member including the output portion of the transmission assembly is connected remotely from the actuator assembly by flexible cabling that runs between the actuator assembly and the driven joint component, to permit flexibility in positioning the driven joint member relative to the actuator assembly.

19 Claims, 16 Drawing Sheets

(52) U.S. Cl.
CPC ......... *A61H 1/0255* (2013.01); *A61H 1/0262* (2013.01); *A61H 1/0266* (2013.01); *A61H 2201/0192* (2013.01); *A61H 2201/1215* (2013.01); *A61H 2201/1481* (2013.01); *A61H 2201/149* (2013.01); *A61H 2201/163* (2013.01); *A61H 2201/1642* (2013.01); *A61H 2201/165* (2013.01); *A61H 2201/5071* (2013.01)

(58) Field of Classification Search
CPC ...... A61H 2201/165; A61H 2001/0266; A61H 1/0259; A61H 1/0262; A61H 1/0274; A61H 1/0277; A61H 1/0281; A61H 1/0285; A61H 1/0288; B25J 9/0006
See application file for complete search history.

(56) References Cited

U.S. PATENT DOCUMENTS

| | | | | |
|---|---|---|---|---|
| 2013/0158444 | A1* | 6/2013 | Herr | A61H 1/0266 601/23 |
| 2013/0197408 | A1* | 8/2013 | Goldfarb | A61H 1/024 601/35 |
| 2015/0190249 | A1* | 7/2015 | Ishibashi | A61F 5/01 623/24 |
| 2016/0184111 | A1* | 6/2016 | Ikedo | A61H 3/00 623/27 |
| 2017/0348176 | A1* | 12/2017 | Herr | B25J 9/0006 |
| 2018/0296422 | A1* | 10/2018 | Sawicki | A61H 1/024 |
| 2019/0047161 | A1* | 2/2019 | Noda | A61H 1/0274 |

FOREIGN PATENT DOCUMENTS

| | | | | |
|---|---|---|---|---|
| CN | 104188786 | A | * | 12/2014 |
| CN | 104825306 | | | 8/2015 |
| CN | 104825306 | A | * | 8/2015 |
| CN | 107468487 | | | 12/2017 |
| KR | 20170053020 | A | * | 5/2017 |

OTHER PUBLICATIONS

English translation for CN 104188786, translated by Espacent.com.*

International Search Report and Written Opinion Issued by WIPO for corresponding International Patent Application No. PCT/US2019/042140 mailed on Oct. 21, 2019.

Second Written Opinion issued by WIPO for corresponding International Patent Application No. PCT/US2019/042140 mailed on Jun. 25, 2020.

* cited by examiner

REMOTE ACTUATION CONFIGURATION FOR POWERED ORTHOTIC DEVICES

RELATED APPLICATIONS

This application is a National Phase of PCT/US2019/042140 filed on Jul. 17, 2019, which claims the benefit of U.S. Provisional Application No. 62/712,322 filed on Jul. 31, 2018, the contents of which are incorporated herein by reference.

FIELD OF INVENTION

The present invention relates to powered movement assistance devices, such as powered orthotic devices, and more particularly to drive mechanisms for driving the joint components of such devices.

BACKGROUND OF THE INVENTION

Many health conditions result in significant impairment to mobility, which may be short of complete paralysis. The large population of persons afflicted with such conditions include, for example, those affected by stroke, multiple sclerosis, ALS, Parkinson's disease, incomplete spinal cord injury, cerebral palsy, and many other conditions resulting from birth defects, disease, injury, or aging. To aid mobility, movement assist devices, such as leg orthotic devices, have been employed.

Traditionally, the field of orthoses has specialized in highly custom, form-fitting braces that are made to fit the unique anatomy and needs of each individual patient. Many physiological abnormalities and gait impairments demand the closely-coupled support of a custom-fabricated brace. The simplest form of such a device is a passive non-powered orthotic device with long-leg braces that extend over the knees and incorporate a pair of ankle-foot orthoses to provide support at the ankles, which are coupled with the leg braces to lock the knee joints in full extension (referred to in the art as "knee-ankle-foot-orthoses" or "KAFOs"). In another configuration, the leg brace further may be connected to a hip component that provides added support at the torso (referred to in the art as "hip-knee-ankle-foot-orthoses" or "HKAFOs"). The hips are typically stabilized by the tension in the ligaments and musculature on the anterior aspect of the pelvis. Since almost all energy for movement is provided by the upper body, ambulation with these passive orthoses require considerable upper body strength and a high level of physical exertion, and provide very slow walking speeds.

To decrease the high level of exertion associated with passive orthoses, the use of powered exoskeleton devices has been under development, which incorporate actuators and drive motors associated with a power supply to assist with locomotion. These powered exoskeleton devices have been shown to increase gait speed and decrease compensatory motions, relative to walking without powered assistance. The use of powered exoskeleton devices presents an opportunity for electronic control of the mobility assistance devices, for enhanced user mobility. However, conventional powered exoskeleton devices do not permit the desired level of customization to fit the unique anatomy and needs of each individual patient. The rigid mechanical and electrical components associated with powered actuation (e.g. electric motors, gears, structural housings, and circuit boards) have precluded high levels of customization to user body type, making integration with highly contoured bracing substantially difficult.

Human walking is characterized by relatively slow hip and knee joint rotational motion and relatively high joint torque. To aid—partially or fully—human walking, a variety of hydraulic, pneumatic, and electromechanical orthoses have been developed by universities and companies over the past few decades. Competing interests include maximizing torque output and controllability while minimizing weight, size, noise, and cost. Recent advancements in brushless motor technology and lithium batteries have made electromechanical actuation systems the dominant option for optimizing these tradeoffs. However, electric motors generally experience peak efficiency at relatively high rates of rotation and low torque output. This then requires a transmission system designed to reduce the speed and amplify the torque to bring the performance into a useful range for biomechanical assistance during walking. In the process of adding a transmission to provide outputs conducive to walking, high gearing ratios have often been used, having an approximate transmission ratio of between 500:1 and 1000:1. This high ratio prevents the joints from moving freely when not under power, eliminating back-drivability. This back-drivability is important for individuals who may have some function and be able to participate in the walking motion cooperatively with the mobility assistance device, as user effort to aid walking in combination with the powered assistance can have health benefits for the user and results in a smoother and more efficient gait and recovery.

As referenced above, powered exoskeleton systems have been developed, which provide mobility assistance for persons with substantial to complete paralysis. Such systems incorporate two powered leg components connected with a hip component to provide bilateral mobility assistance at the hip and knee joints. For such systems, Applicant has developed custom actuators with a low transmission ratio of approximately 30:1, a low profile, and relatively low noise output, while still offering appropriate joint speeds and torques of approximately 14 Nm (continuous) in a package weighing approximately 40 oz. An example of such a device is described in Applicant's International Patent Appl. No. PCT/US2015/023624 filed on Mar. 3, 2015. The exoskeleton actuators of the nature described in such application are designed and sized for adults with essentially complete paralysis of the lower limbs. Thus, the size, weight, and torque generally may be too high for individuals who experience only partial mobility impairment, as would be useful for conventional orthotic devices configured as KAFOs and HKAFOs.

SUMMARY OF THE INVENTION

The present invention provides an actuation system for joints for powered orthotic devices, and KAFO and HKAFO devices in particular, that can be readily integrated with standard orthotic bracing that can be customized to user body type. Such actuation system provides a smaller and lighter solution for powering wearable orthotic systems, which should also require less torque that is more suitable for orthotic devices as compared to more comprehensive exoskeleton systems in which joint actuation systems previously have been employed. The present invention addresses the deficiencies of conventional configurations by minimizing the size of the driven joint, and by allowing the drive unit to be located remotely relative to the driven joint, transmitting power via flexible cabling such as for example Bowden cables. With such configuration, varus and valgus angling at the human knee joint and/or hip abduction or adduction in the frontal plane is optimized for walking.

In exemplary embodiments, an actuator system for a powered orthotic device is configurated as a high torque, low profile actuator with a flat electric motor and a two-stage speed reduction drive transmission. The two-stage transmission may include belt/chain/cable stages, with the output portion of the final stage and driven joint member being attached remotely from the input portion of the final stage, and from the first stage of the transmission, through Bowden cable sheaths. More particularly, in exemplary embodiments the first stage includes a small diameter belt pulley or sprocket attached to a shaft of a flat profile brushless motor, which transmits power to a larger belt pulley or sprocket to form the first stage of speed reduction. The larger belt pulley or sprocket is attached to the same shaft as another small diameter sprocket. This small diameter sprocket transmits power to another sprocket of larger diameter through a roller chain to form the second stage of speed reduction. Cables are attached to the second stage sprocket, for example by means of connection to a second roller chain using suitable fittings (for example crimp fittings), and free ends of the cables are opposingly are routed through Bowden cable sheaths. The cables then are attached to a driven joint member that acts as a cable pulley for driving a joint in an orthotic device.

By using flexible cabling that is routed through cable sheaths to span the second stage, the large cable pulley that provides the output, and along with it the driven joint member, are located remotely from drive motor and the first stage. The cable/sheath configuration permits a degree of flexibility in positioning the driven joint member relative to the actuator assembly containing the drive unit. Accordingly, the actuator system may be integrated into a wide range of standard orthotic devices that may be customized to user body type, i.e., the actuator system is suitable for use with any standard type bracing as fitted to a given user body type without the need for additional customization of the actuator system itself.

An aspect of the invention is an enhanced actuator system for an orthotic device that may be incorporated into customized orthotic devices by remotely positioning the driven joint member from the actuator assembly via flexible cabling. In exemplary embodiments, an actuator system for a powered orthotic device includes an actuator assembly comprising a motor and a first portion of a transmission assembly that provides a speed reduction of a motor speed to an output speed; and a driven joint member comprising an output portion of the transmission assembly and a connector component for connecting the driven joint member to a brace component of the orthotic device. The driven joint member including the output portion of the transmission assembly is connected remotely from the actuator assembly by flexible cabling that runs between the actuator assembly and the driven joint member, to permit flexibility in positioning the driven joint member relative to the actuator assembly.

In exemplary embodiments, the actuator assembly includes a first stage of speed reduction of the transmission assembly connected to an output shaft of the motor for providing a speed reduction of the motor output; and an input portion of a second stage of speed reduction of the transmission assembly linked to an output of the first stage of speed reduction. The driven joint member comprises an output portion of the second stage of speed reduction of the transmission assembly for providing a speed reduction relative to the output of the first stage. The driven joint member including the output portion of the second stage is connected remotely from the actuator assembly by the flexible cabling to permit the flexibility in positioning the driven joint member relative to the actuator assembly.

In exemplary embodiments, the driven joint member includes a lateral cap and a medial cap, wherein the lateral cap is rotatable relative to a medial cap. The lateral cap includes a first attachment component that is connectable to a first brace component of the orthotic device, and the medial cap includes a second attachment component that is connectable to a second brace component of the orthotic device, whereby rotation of the lateral cap relative to the medial cap rotates the first attachment component relative to the second attachment component to operate a joint of the orthotic device. The medial cap includes a cable port for inserting flexible cabling into the driven joint member, and the lateral cap includes a cable slot that receives the flexible cabling from the cable port and anchors the flexible cabling within the cable pulley. The lateral cap may rotate relative to the medial cap about a radial bearing.

Another aspect of the invention is an orthotic device including an orthotic brace system and an actuator system according to any of the embodiments. The actuator assembly of the actuator system is attached remotely from the driven joint member, and the actuator assembly drives the driven joint member to act as a joint of the orthotic bracing system. The orthotic bracing system may be a KAFO device in which the driven joint member acts as the knee joint. The orthotic bracing system may be an HKAFO device in which a first driven joint member of a first actuator system acts as the knee joint, and/or a second driven joint member of a second actuator system acts as a hip joint.

In alternative embodiments, a joint control system may include a non-powered motion control unit configured as an intelligent damper or a lock, instead of driving the cables (and thus the orthotic joint) with a motor and through a powered actuator including a transmission. Movement of the cables may be controlled through damping via a friction brake or other damping source, such as a hydraulic piston and control valve. Alternatively, the motion control unit may include a locking mechanism, controlled by a friction clutch or a positive-engagement lock. A solenoid may be used in such cases to provide the locking. In the case of the damper or the lock mechanism, a transmission may still be employed to increase the effective holding force against cable motion. The damper or lock mechanism provides remote control of an orthotic joint through flexible cabling comparably as in the powered embodiments. Accordingly, the remote control performed by a joint control system may either be powered actuation, damping, or locking.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
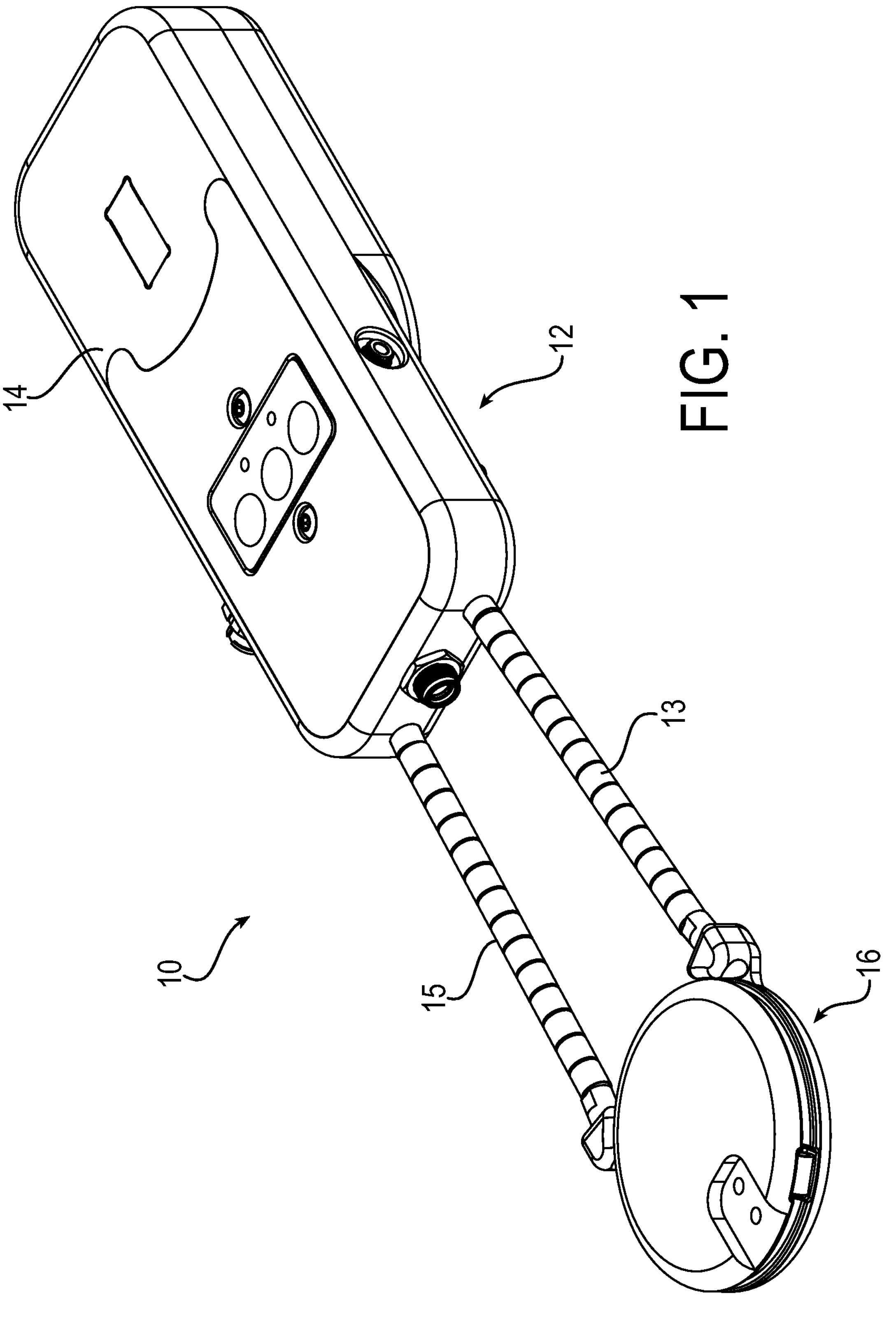
FIG. 1 is a drawing depicting an isometric view of an exemplary actuator system for use with an orthotic device, in accordance with embodiments of the present invention.
Figure 2:
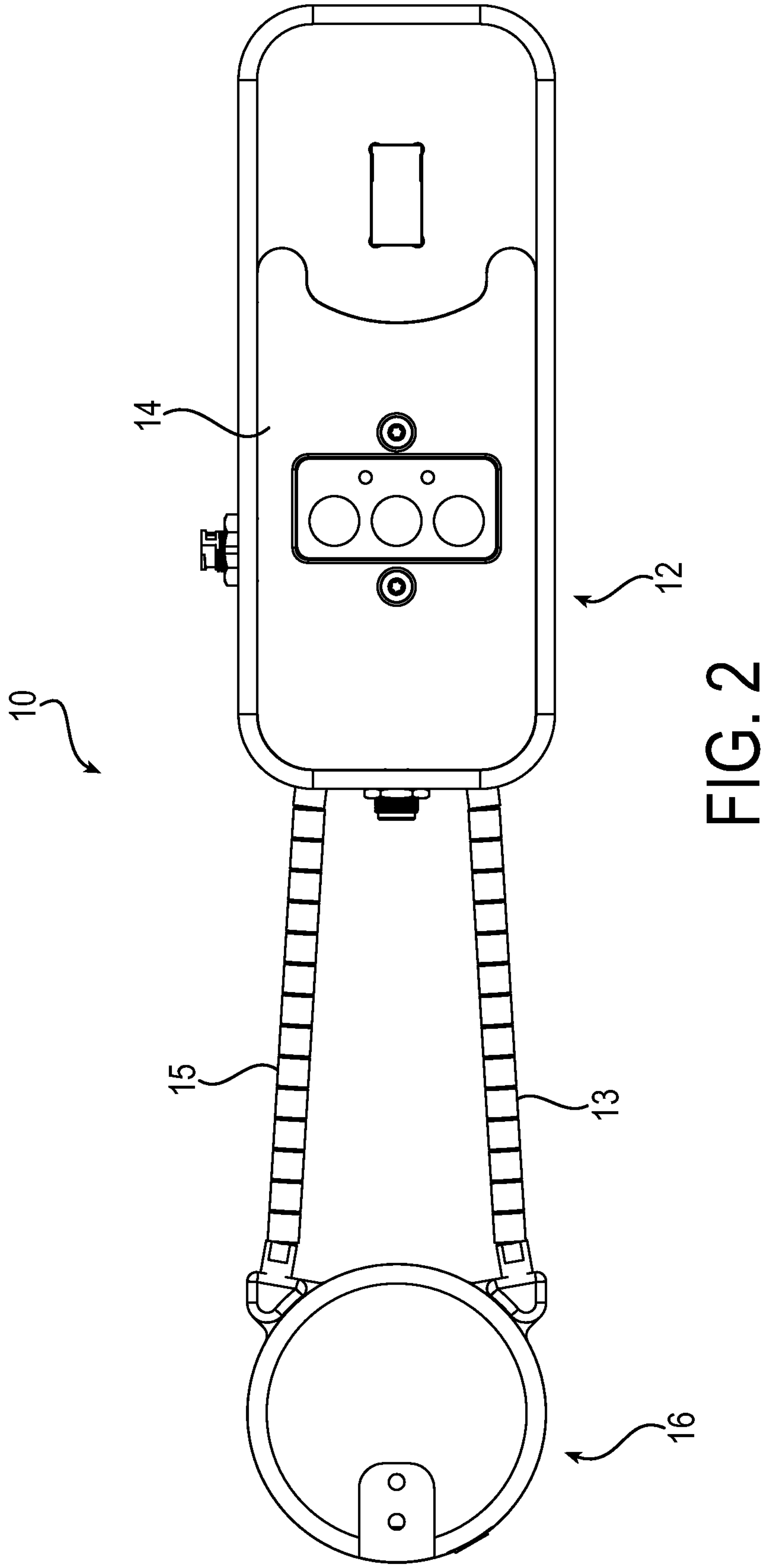
FIG. 2 is a drawing depicting a top view of the exemplary actuator system of FIG. 1.
Figure 3:
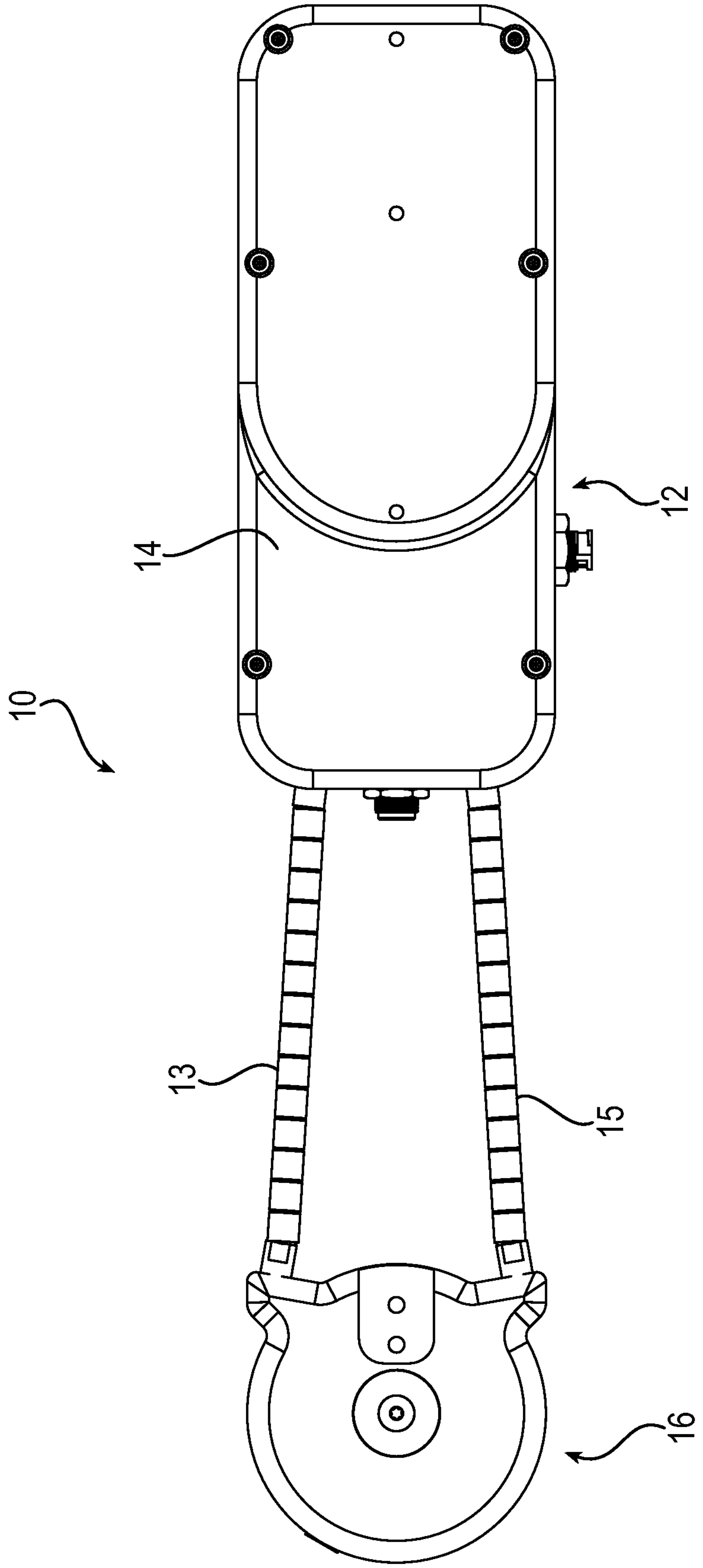
FIG. 3 is a drawing depicting a bottom view of the exemplary actuator system of FIG. 1.
Figure 4:
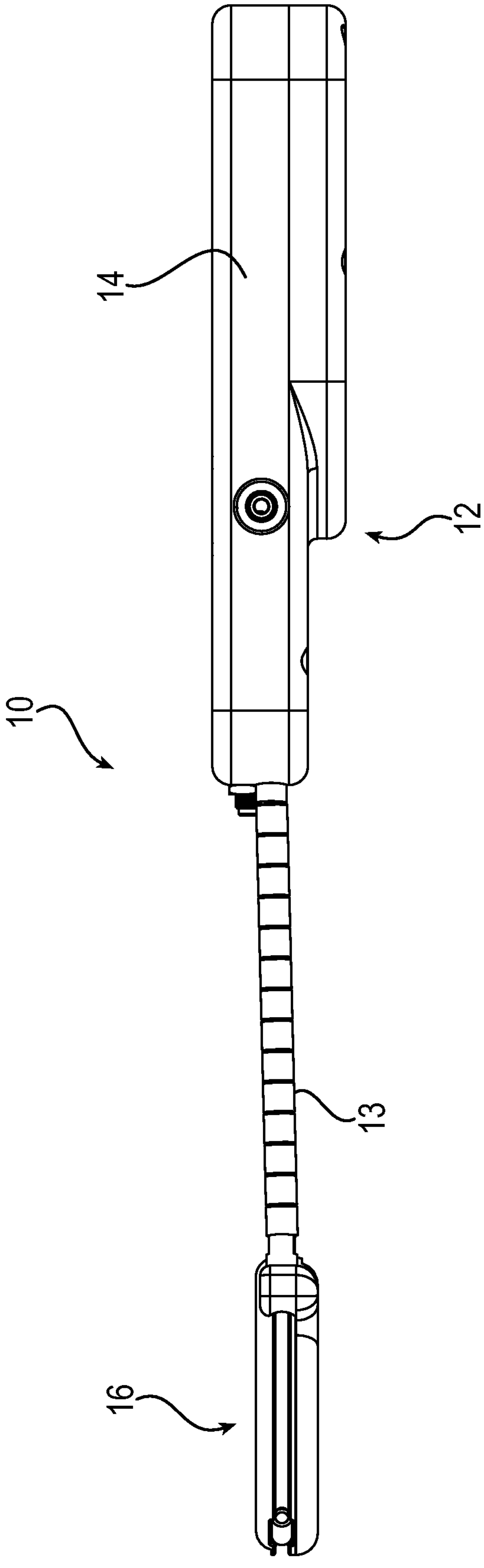
FIG. 4 is a drawing depicting a side view of the exemplary actuator system of FIG. 1.

Embodiments of the present invention will now be described with reference to the drawings, wherein like reference numerals are used to refer to like elements throughout. It will be understood that the figures are not necessarily to scale.

FIGS. 1-4 are drawings depicting various views of an exemplary actuator system 10 for use with an orthotic device, in accordance with embodiments of the present invention. The actuator system 10 includes an actuator assembly 12 that is housed within an actuator housing 14, and a driven joint member 16. The driven joint member 16 is remotely connected from the actuator assembly 12 by flexible cabling, which may be configured as a pair of Bowden cable sheaths 13 and 15 that include respective Bowden cables.

An aspect of the invention, therefore, is an enhanced actuator system for a powered orthotic device that may be incorporated into customized orthotic devices by remotely positioning the driven joint member from the actuator assembly via flexible cabling. In exemplary embodiments the actuator system includes an actuator assembly and a driven joint member. The driven joint member is connected remotely from the actuator assembly by flexible cabling to permit flexibility in positioning the driven joint member relative to the actuator assembly. The actuator system may include an actuator assembly having a motor and a first portion of a transmission assembly that provides a speed reduction of a motor speed to an output speed, and a driven joint member having an output portion of the transmission assembly and a connector component for connecting the driven joint member to a brace component of the orthotic device. The driven joint member including the output portion of the transmission assembly is connected remotely from the actuator assembly by flexible cabling that runs between the actuator assembly and the driven joint member, to permit flexibility in positioning the driven joint member relative to the actuator assembly.

In exemplary embodiments, the system is a powered actuator system in which a motor drives the joint member, by a speed reduction transmission system, which for example is a two-stage transmission. In such embodiments, the actuator assembly includes a first stage of speed reduction of the transmission assembly connected to an output shaft of the motor for providing a speed reduction of the motor output, and an input portion of a second stage of speed reduction of the transmission assembly linked to an output of the first stage of speed reduction. The driven joint member comprises an output portion of the second stage of speed reduction of the transmission assembly for providing a speed reduction relative to the output of the first stage. The driven joint member including the output portion of the second stage is connected remotely from the actuator assembly by the flexible cabling to permit the flexibility in positioning the driven joint member relative to the actuator assembly.

Figure 5:
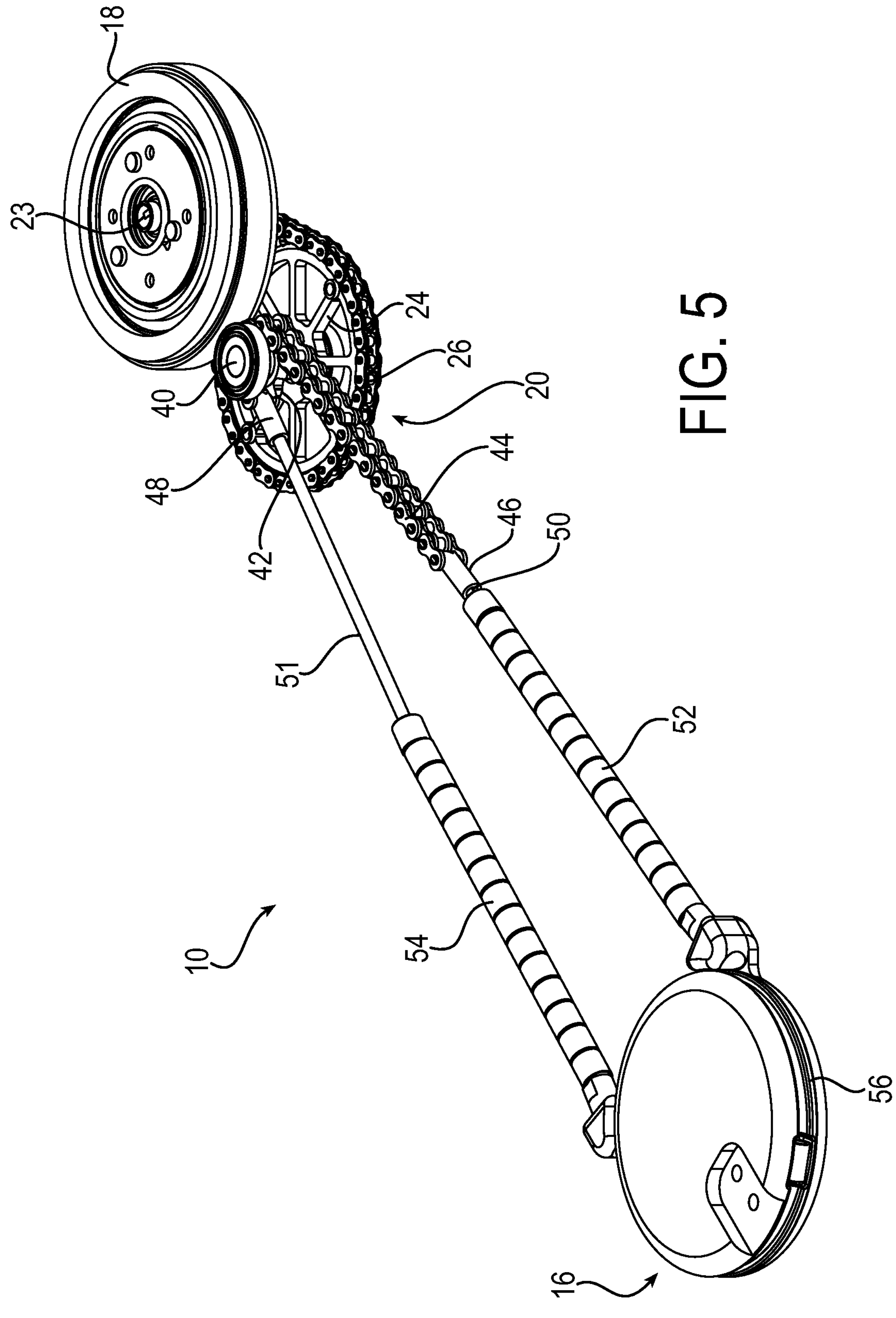
FIG. 5 is a drawing depicting an isometric view of the drive components of the actuator system of FIG. 1 in isolation.
Figure 6:
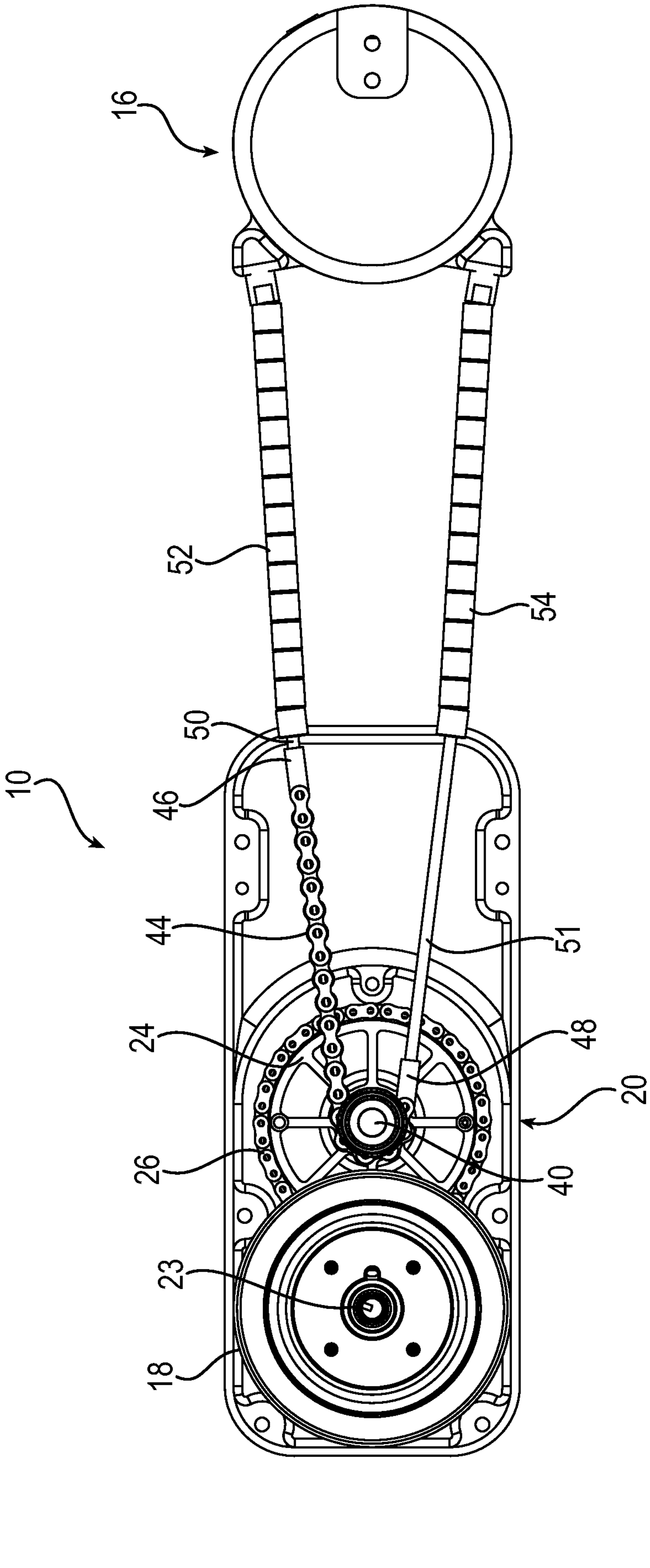
FIG. 6 is a drawing depicting a top view of the portion of the actuator system that includes the components as depicted in FIG. 5.

FIG. 5 is a drawing depicting an isometric view of the drive components of the actuator system of FIG. 1 in isolation. FIG. 6 is a drawing depicting a top view of the portion of the actuator system that includes the components as depicted in FIG. 5. In these views, the actuator housing 14 is removed so as to depict the actuator assembly components. Generally, the actuator assembly components include a motor 18 and a transmission system 20 that operates to drive the joint member 16. As described in more detail below, in exemplary embodiments the actuator assembly is configured as a high torque, low profile actuator with the motor 18 configured as a flat electric motor, and the transmission system 20 being configured as a two-stage speed reduction drive transmission. The two-stage transmission may include belt/chain/cable stages, with the output of the final stage and the driven joint member 16 being attached remotely from the first stage of the transmission through Bowden cable sheaths. In addition, the motor 18 may be a brushless DC motor.

Figure 7:
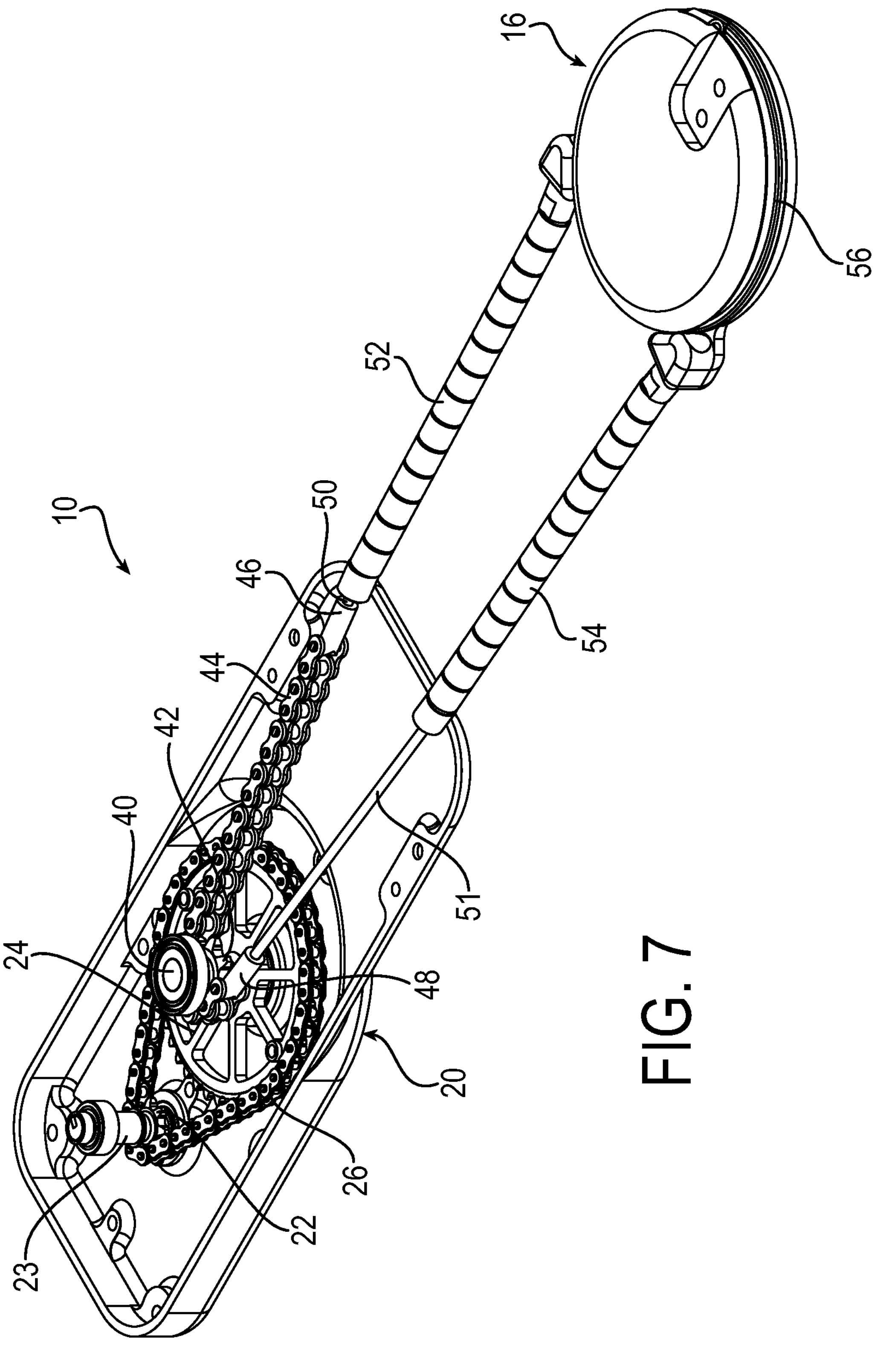
FIG. 7 is a drawing depicting an isometric view of the actuator system of FIG. 1 with the actuator housing and motor removed to illustrate the stages of the actuator transmission.
Figure 8:
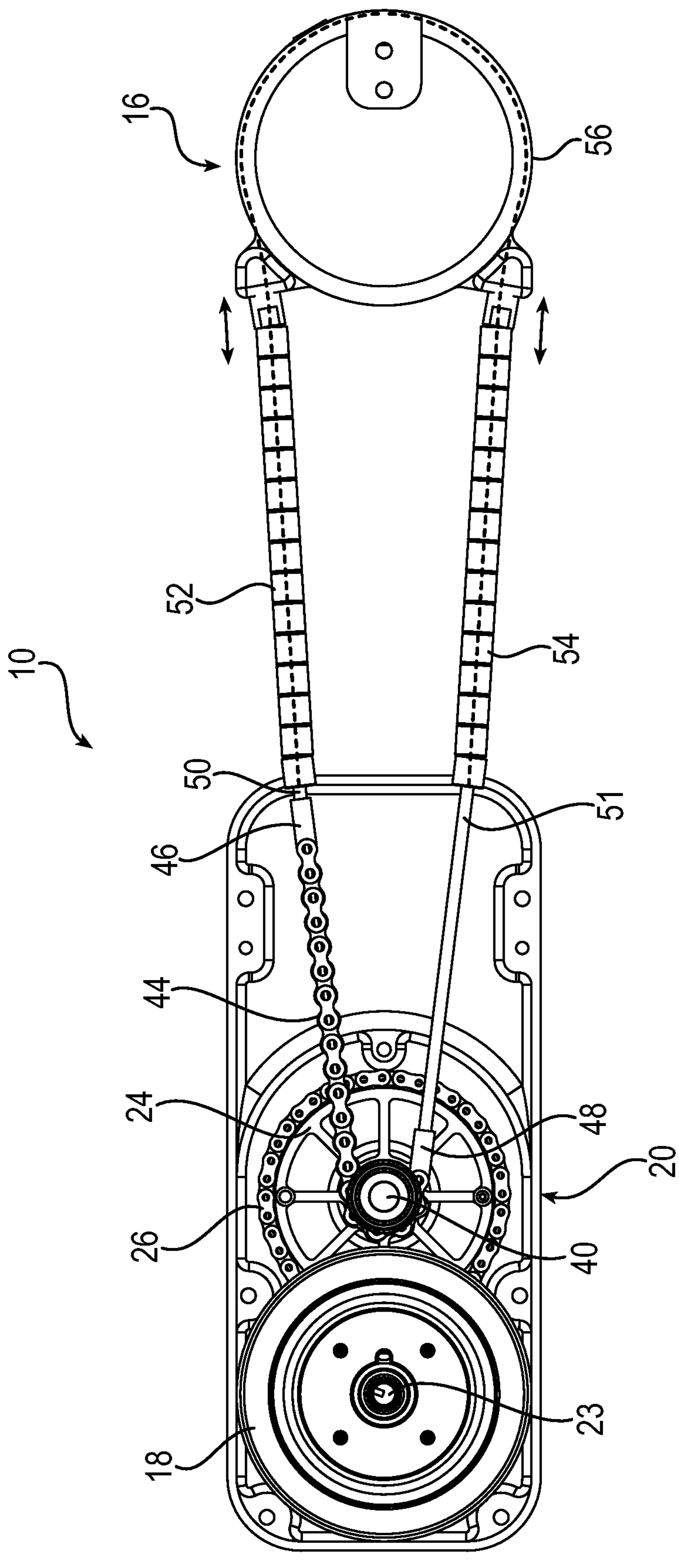
FIG. 8 is a drawing depicting a top view of the portion of the actuator system as depicted in FIG. 7.
Figure 9:
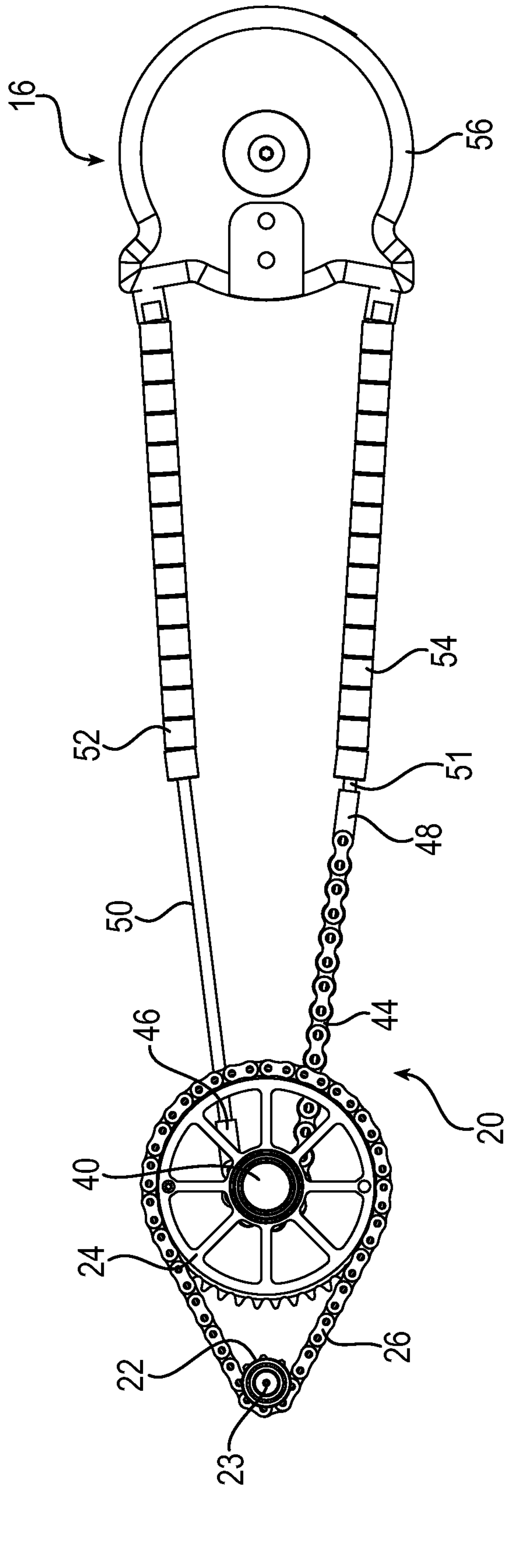
FIG. 9 is drawing depicting the transmission stages of the actuator system in isolation.

To further illustrate the detailed components of the actuator assembly, FIG. 7 is a drawing depicting an isometric view of the actuator system 10 of FIG. 1, with the actuator housing 14 and motor 18 removed to better illustrate the stages of the actuator transmission system 20. FIG. 8 is a drawing depicting a top view of the actuator system as depicted in FIG. 7. FIG. 9 is drawing depicting the transmission system 20 in isolation including the three stages of said transmission system.

Referring to FIGS. 5-9, in exemplary embodiments a first stage (and see particularly FIGS. 7 and 9 as best depicting the first stage) of the transmission system 20 includes a relatively small diameter first sprocket 22 that is attached to an output shaft 23 of the flat profile brushless motor 18. The first sprocket 22 thus receives the output shaft 23 of the motor. The small diameter sprocket 22 transmits power to a relatively large second sprocket 24 via a first transmission member 26 to form the first stage of speed reduction. In other words, for appropriate speed reduction a diameter of the second sprocket is larger than a diameter of the first sprocket. In this embodiment, the first transmission member 26 is configured as a chain that engages around the first and second sprockets.

As an alternative configuration of the first stage of the transmission system 20, the first stage may be configured as a belt/pulley stage instead of a sprocket/chain stage. In such embodiment, the first stage of the transmission system 20 includes a relatively small diameter first stage pulley that is attached to an output shaft of the flat profile brushless motor 18. The small diameter first stage pulley similarly transmits power to a relatively large larger diameter pulley, and in this embodiment the first transmission member is configured as a belt that engages around the two pulleys. The belt may be tensioned by spring loaded idlers located on opposite sides of the first pulley. Similarly as in the previous embodiment, for appropriate speed reduction a diameter of the second pulley is larger than a diameter of the first stage pulley.

For the second stage of speed reduction, an input portion of the second stage of speed reduction is linked to an output of the first stage of speed reduction. Generally, the input portion of the second stage includes a rotating member connected between the output of the first stage and the flexible cabling. The output portion of the second stage, which is incorporated into the driven joint member, includes a cable pulley that receives the flexible cabling. The cable pulley has a diameter larger than a diameter of the rotating member to form the second stage of speed reduction.

Referring to the figures, the relatively large diameter second sprocket 24 is the output of the first stage of speed reduction, and is attached to a shaft 40. The shaft 40 is commonly attached to a rotating member, such as for example another relatively small diameter third sprocket 42 (seen best in the viewpoint of FIGS. 5 and 7). The third sprocket 42 acts as an input portion of the second stage of speed reduction that is linked to the output (second sprocket 24) of the first stage of speed reduction. The teeth of the third sprocket 42 interact with a second roller chain 44 having opposing ends that are fitted with respective fittings 46 and 48, which may be configured as crimp fittings. The crimp fittings 46 and 48 are attached to respective ends of the roller chain 44 and receive respective ends of transmission cable portions 50 and 51 to attach the first and second cable portions to the actuator assembly. The first and second transmission cable portions may be a single Bowden cable that extends around the joint member 16, or may be two separate Bowden cables that have end portions that are anchored within the joint member 16, as further detailed below. The crimp fittings 46 and 48 are crimped about the cable ends so as to provide a secure chain/cable connection of the Bowden cable portions to the actuator assembly. Although use of crimp fittings constitutes an exemplary embodiment, other configurations of fittings or connections 46 and 48 for the cable ends may be employed, such as for example swage fittings, welding, castings, and the like.

The transmission Bowden cable portions 50 and 51 are then routed through respective opposing Bowden cable sheaths 52 and 54, and the transmission cable portions 50 and 51 are attached to a relatively large cable pulley 56 of the driven joint member 16 to form the output portion of the second stage of speed reduction. In other words, for appropriate speed reduction a diameter of the cable pulley 56 is larger than a diameter of the third sprocket 42. In exemplary embodiments, cable portion 50 may be referred to as an extension cable portion 50 that winds around the cable pulley 56 during joint extension, and cable portion 51 may be referred to as a flexion cable portion 51 that winds around the cable pulley 56 during joint flexion. The driven joint member 16 is attached to the cable pulley 56 permanently, such as with a retaining compound or press fit configuration. Additional details regarding the configuration of the joint member 16 relative to the transmission cable portions 50 and 51 and cable pulley 56 are described below.

With such configuration, the actuator system 10 has a thin profile and is extremely lightweight relative to its output torque capability. Each stage of the two-stage transmission system is highly efficient and thus very little power is lost through the transmission system. Importantly, the transmission is also back-drivable, meaning that a torque applied at the output via the driven joint will cause the transmission, and ultimately the motor, to spin. This back-drivability is significant as it enables cooperative motion when worn by a user who is able to contribute some power via their own muscles. In an exemplary embodiment, the actuator system has a total transmission ratio of approximately 62.21:1, and a maximum continuous torque of approximately 10.2 Nm. With a weight of approximately 24 oz, the continuous torque-to-weight ratio of the actuator system in this embodiment is 0.43 Nm/oz. Such parameters are highly suitable for operation in powered orthotic devices, including KAFO and HKAFO devices, as being wholly compatible with mobility assistance for walking.

The actuator assembly further may include integrated control electronics that are encompassed within the actuator housing. The control electronics may include a battery, sensors, and electronic circuit boards that control operation of the overall actuator system 10. In exemplary embodiments in which the actuator assembly is driven by a brushless DC motor, magnets in proximity to or coupled to the motor shaft may be provided with embedded sensors to sense the motor shaft rotation. The sensing components may operate as a Hall-effect sensor with connections to processor circuitry in the control electronics to measure the motor operation, which in turn may be used to determine the resultant positioning of the driven joint member 16. In this manner, accurate positioning of the joint member is achieved for precise controlling of the actuator system.

For added resistive torque beyond what the motor can provide, the second stage of the transmission system speed reduction further may include a braking element. To achieve this, an electric actuator (or actuators) engage a mechanical interference or friction lock to prevent motion of the second belt sprocket 24 (or belt pulley). To prevent damage to the transmission, the braking element may be allowed to slip above a certain torque level.

In the previous embodiments, a joint control system is configured having a control assembly that is a powered actuation system in which a motor initially provides the driving force that acts on the remote flexible cabling through a transmission. In alternative embodiments, a joint control system may be configured to include a non-powered motion control unit, which for example may be an intelligent damper or a lock, instead of driving the cables (and thus the orthotic joint) with a motor and through powered actuator including a transmission. Movement of the cables may be controlled by the motion control unit through damping via a friction brake or other damping source, such as a hydraulic piston and control valve. Alternatively, the motion control unit may include a locking mechanism, controlled by a friction clutch or a positive-engagement lock. A solenoid may be used in such cases to provide the locking. In the case of the damper or the lock mechanism, a transmission may still be employed to increase the effective holding force against cable motion. The damper or lock mechanism provides remote control of an orthotic joint through flexible cabling comparably as in the powered embodiments. Accordingly, the remote control by a joint control system may either be powered actuation, damping, or locking.

In exemplary embodiments, the driven joint member includes a cable pulley configuration comprising a lateral cap that is rotatable relative to a medial cap. The medial cap includes a cable port for inserting the flexible cabling into the cable pulley, and the lateral cap includes a cable slot that receives the flexible cabling from the cable port and anchors the flexible cabling within the cable pulley. Ends of the flexible cabling include an anchor fitting, such as a crimp fitting, and the crimp fitting is located within the cable slot in a manner that drives the rotation. The flexible cabling includes Bowden cable portions that are connected to the crimp fitting and routed from the crimp fitting in the cable slot through the cable slot. The lateral cap includes one or more range limiting tracks, and the medial cap includes one or more respective stop blocks, that extend into the range limiting track(s), wherein a rotation range of the lateral cap relative to the medial cap is limited by the range limiting track(s) interacting with the stop block(s).

Figure 10:
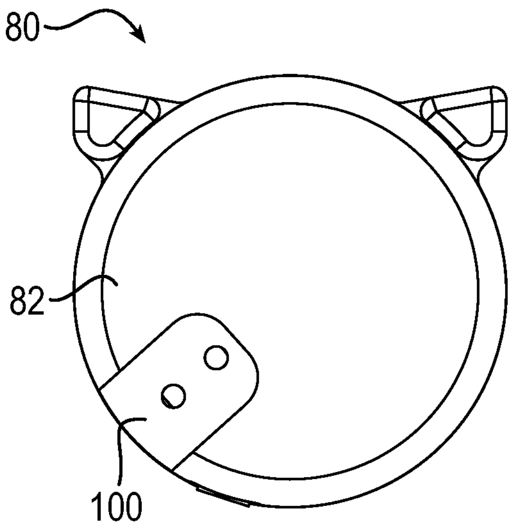
FIG. 10 is a drawing depicting an outer view of an exemplary driven joint member in accordance with embodiments of the present invention.
Figure 11:
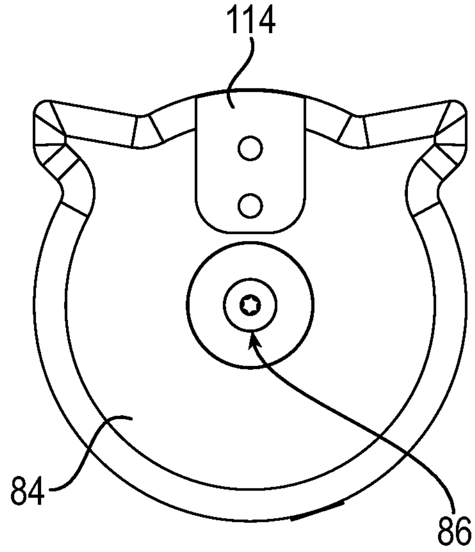
FIG. 11 is a drawing depicting an inner view of the exemplary driven joint member.
Figure 12:
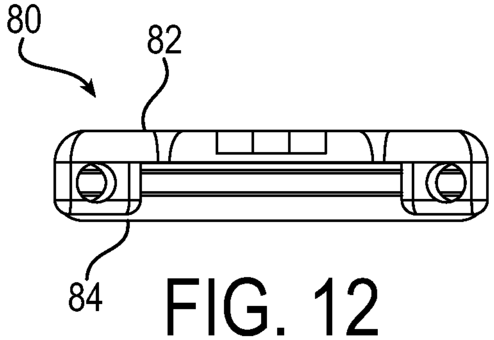
FIG. 12 is a drawing depicting a first edge view of the exemplary driven joint member.
Figure 13:
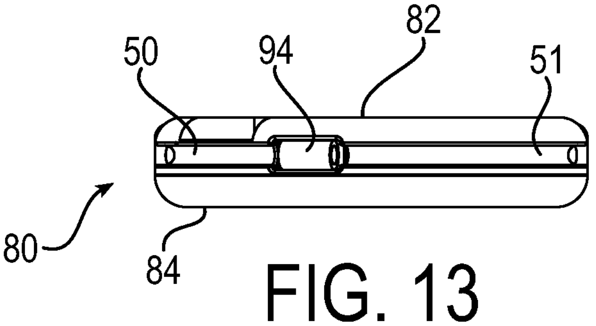
FIG. 13 is a drawing depicting second first edge view opposite from the first edge view of the exemplary driven joint member.

FIGS. 10-13 are drawings depicting various views of an exemplary configuration of the driven joint member 80, which includes the output of the second stage of the transmission that includes the larger cable pulley referenced above. In particular, FIG. 10 is a drawing depicting an outer view of the exemplary driven joint member 80, and FIG. 11 is a drawing depicting an inner view of the exemplary driven joint member. In this context, an outer view refers to a viewpoint from a side of the joint member that is visible during use, i.e., facing away from a user's body. An inner view refers to a viewpoint from a side of the joint member that is not visible during use, i.e., facing toward or against a user's body. FIG. 12 is a drawing depicting a first edge view of the exemplary driven joint member. FIG. 13 is a drawing depicting second edge view opposite from the first edge view of the exemplary driven joint member. The figures in this example depict a driven joint member associated with a right knee joint, although driven joint members associated with other body joints would be configured comparably.

The driven joint member 80 includes a lateral cap 82 that faces outward from the body during use (see FIG. 10) and a medial cap 84 that faces against the body during use (see FIG. 11). The lateral cap and the medial cap rotate relative to each other about a bearing structure 86 to form the larger cable pulley referenced above. The driven joint member 80 may be made from a variety of materials, depending on the strength requirements of the orthotic device or brace to which the actuation system is to be integrated. Steel, stainless steel, and aluminum are common material choices for orthotic joints and may be used in connection with described embodiments of the driven joint member 80.

Figure 14:
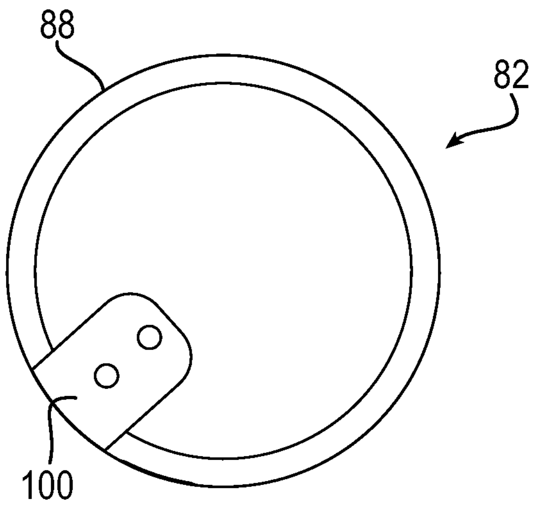
FIG. 14 is a drawing depicting an outer view of the lateral cap component of the exemplary driven joint member.
Figure 15:
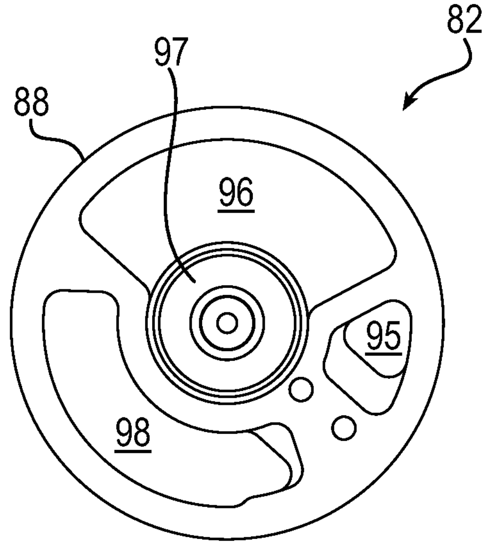
FIG. 15 is a drawing depicting an inner view of the lateral cap component of the exemplary driven joint member.
Figure 16:
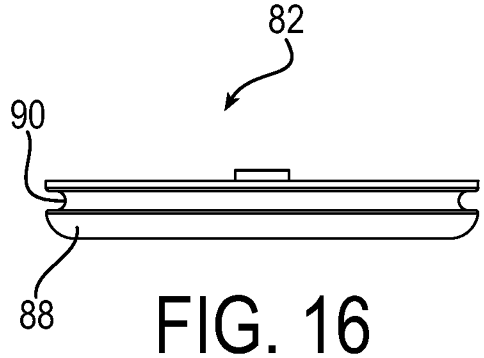
FIG. 16 is a drawing depicting a first edge view of the lateral cap component of the exemplary driven joint member.
Figure 17:
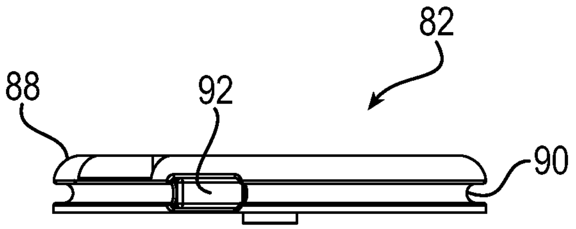
FIG. 17 is a drawing depicting a second edge view opposite from the first edge view of the lateral cap component exemplary driven joint member.

FIGS. 14-17 further depict additional views of the lateral cap 82 in isolation of the driven joint member 80. In particular, FIG. 14 is a drawing depicting an outer view of the lateral cap component of the exemplary driven joint member. FIG. 15 is a drawing depicting an inner view of the lateral cap component of the exemplary driven joint member. FIG. 16 is a drawing depicting a first edge view of the lateral cap component of the exemplary driven joint member. FIG. 17 is a drawing depicting a second edge view opposite from the first edge view of the lateral cap component exemplary driven joint member. The lateral cap 82 includes a lateral cap housing 88 that defines a cable slot 90 that receives the cable portions 50 and 51 as further detailed below. As shown particularly in the edge view of FIG. 17, the lateral cap 82 has a fitting slot 92. As relatedly shown in the edge view of FIG. 13 showing the full driven joint, a crimp fitting 94 is located within the fitting slot 92. The crimp fitting 94 receives and secures the ends of the cable portions 50 and 51. As referenced above, the cable portions 50 and 51 may comprise two different cables that are secured within the crimp fitting 94, or the cable portions 50 and 51 may be opposite portions of a single cable that extends through the crimp fitting 94. As the cable portions are pulled in the flexion or extension direction, the crimp fitting 94 operates as a driving mechanism that rotates the lateral cap 82 relative to the medial cap 84.

As best depicted in FIG. 15, the lateral cap housing 88 further defines a first range limiting track 96 and a second range limiting track 98 that cooperate with corresponding components of the medial cap 84 to limit the extension and flexion range of the joint member 80. A third recess 95 may be cut away from the material of the lateral cap 82, which provides for a degree of weight reduction of the lateral cap component. The lateral cap housing 88 further defines a bearing hole 97 that receives the radial bearing structure as further detailed below. The lateral cap 82 further includes a first attachment recess 100 (see e.g., FIGS. 10 and 14) that attaches to a joint bar that forms part of a bracing system of an orthotic device. For example, the first attachment recess 100 may be a lower attachment component that attaches to a first joint bar of an orthotic device.

Figure 18:
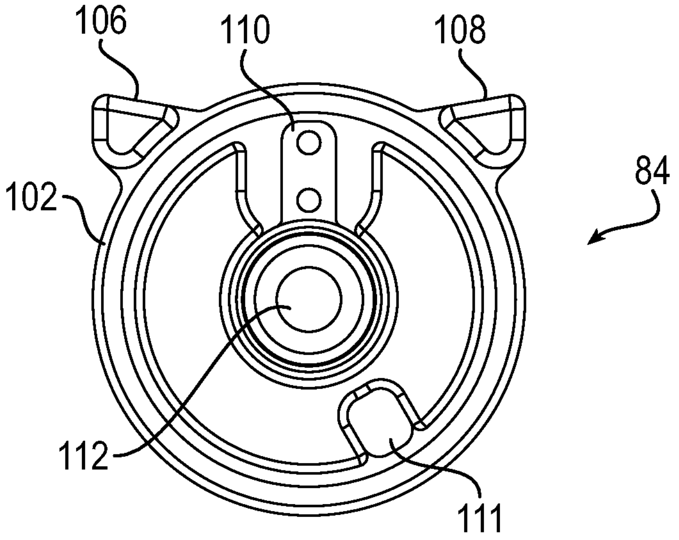
FIG. 18 is a drawing depicting an outer view of the medial cap component of the exemplary driven joint member.
Figure 19:
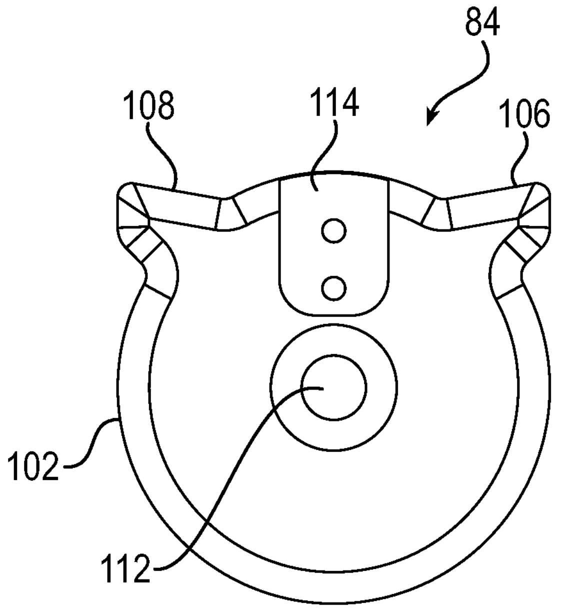
FIG. 19 is a drawing depicting an inner view of the medial cap component of the exemplary driven joint member.
Figure 20:
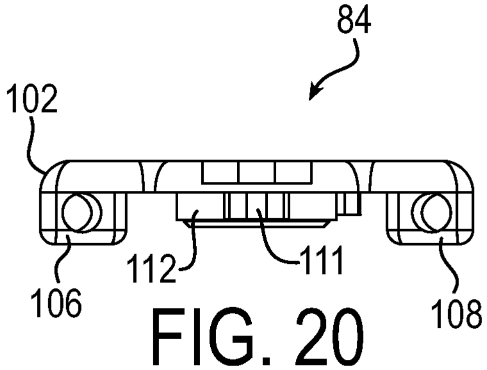
FIG. 20 is a drawing depicting a first edge view of the medial cap component of the exemplary driven joint member.
Figure 21:
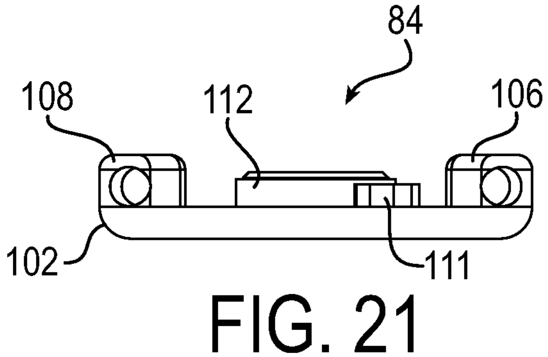
FIG. 21 is a drawing depicting a second edge view opposite from the first edge view of the medial cap component exemplary driven joint member.

FIGS. 18-21 further depict additional views of the medical cap 84 in isolation of the driven joint member 80. In particular, FIG. 18 is a drawing depicting an outer view of the medial cap component of the exemplary driven joint member. FIG. 19 is a drawing depicting an inner view of the medial cap component of the exemplary driven joint member. FIG. 20 is a drawing depicting a first edge view of the medial cap component of the exemplary driven joint member. FIG. 21 is a drawing depicting a second edge view opposite from the first edge view of the medial cap component exemplary driven joint member. The medial cap 84 includes a medial cap housing 102 that defines a first sheath receiver 106 that receives the first Bowden cable sheath 52 including the extension cable portion 50, and a second sheath receiver 108 that receives the second Bowden cable sheath 54 including the flexion cable portion 51. The cable portions extend through the respective sheath receivers and into the cable slot 90 of the lateral cap. The medial cap 84 further includes a first stop block 110 that extends into the first range limiting track 96 of the lateral cap 82, and a second stop block 111 that extends into the second first range limiting track 98 of the lateral cap 82. The medial cap 84 further includes a circular post 112 about which the radial bearing 86 is positioned.

Accordingly, when the lateral cap 82 and medial cap 84 are joined together, the radial bearing structure 86 is positioned within the bearing hole 97 between the surface of the lateral cap 82 that defines the bearing hole 97 and the circular post 112. The medial cap 84 further includes a second attachment recess 114 (see, e.g., FIGS. 11 and 19) that attaches to another joint bar of an orthotic device. For example, the second attachment recess 114 may be an upper attachment component that attaches to a second joint bar that also forms part of the bracing system of an orthotic device. The first and second attachment recesses are positioned offset relative to each other, which enables the first and second attachment recesses to rotate past each other.

Figure 22:
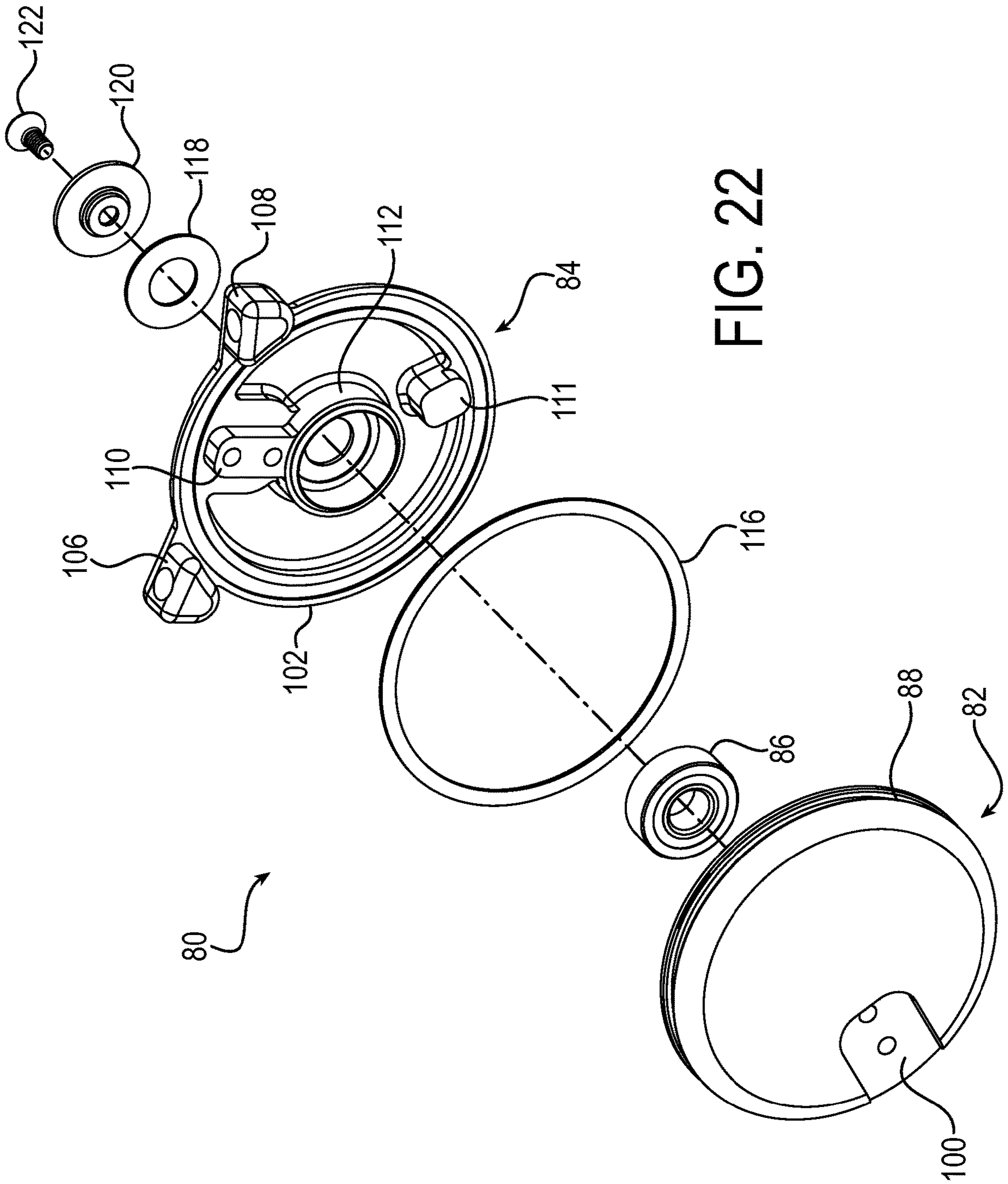
FIG. 22 is a drawing depicting an exploded view of the exemplary driven joint member.

FIG. 22 is a drawing depicting an exploded view of the exemplary driven joint member 80. Like components are identified with like references numerals in FIG. 22 as in the previous joint member figures to provide additional illustration of the pertinent components. FIG. 22 in addition illustrates details as to the operation of the bearing structure 86. The bearing structure 86 is configured as a radial bearing that accommodates radial loads as the lateral cap rotates relative to the medial cap. The driven joint member 80 further includes a thrust bearing 116 that is fixed between the lateral cap 82 and the medial cap 84. The thrust bearing 116 is configured as a ring structure that accommodates laterals loads as may occur during abduction and adduction relative to the joint. The thrust bearing 116 may be made of a polytetrafluoroethylene (PTFE) material such as Teflon® or the like. The driven joint member further may include a thrust washer 118 located on an opposite side of the medial cap relative to thrust bearing 116. The thrust washer 118 also may be made of PTFE or like material and cooperates with the thrust bearing to accommodate lateral loads.

The driven joint member 80 further may include a washer 120, such as a metal washer, and a fastener element 122, such as a bolt or screw. The fastener extends through the medial cap 84 and is anchored into the lateral cap 82 on the inner side of the lateral cap. Accordingly, the fastener 122 rotates in conjunction with the rotation of the lateral cap and relative to the medial cap.

Figure 23:
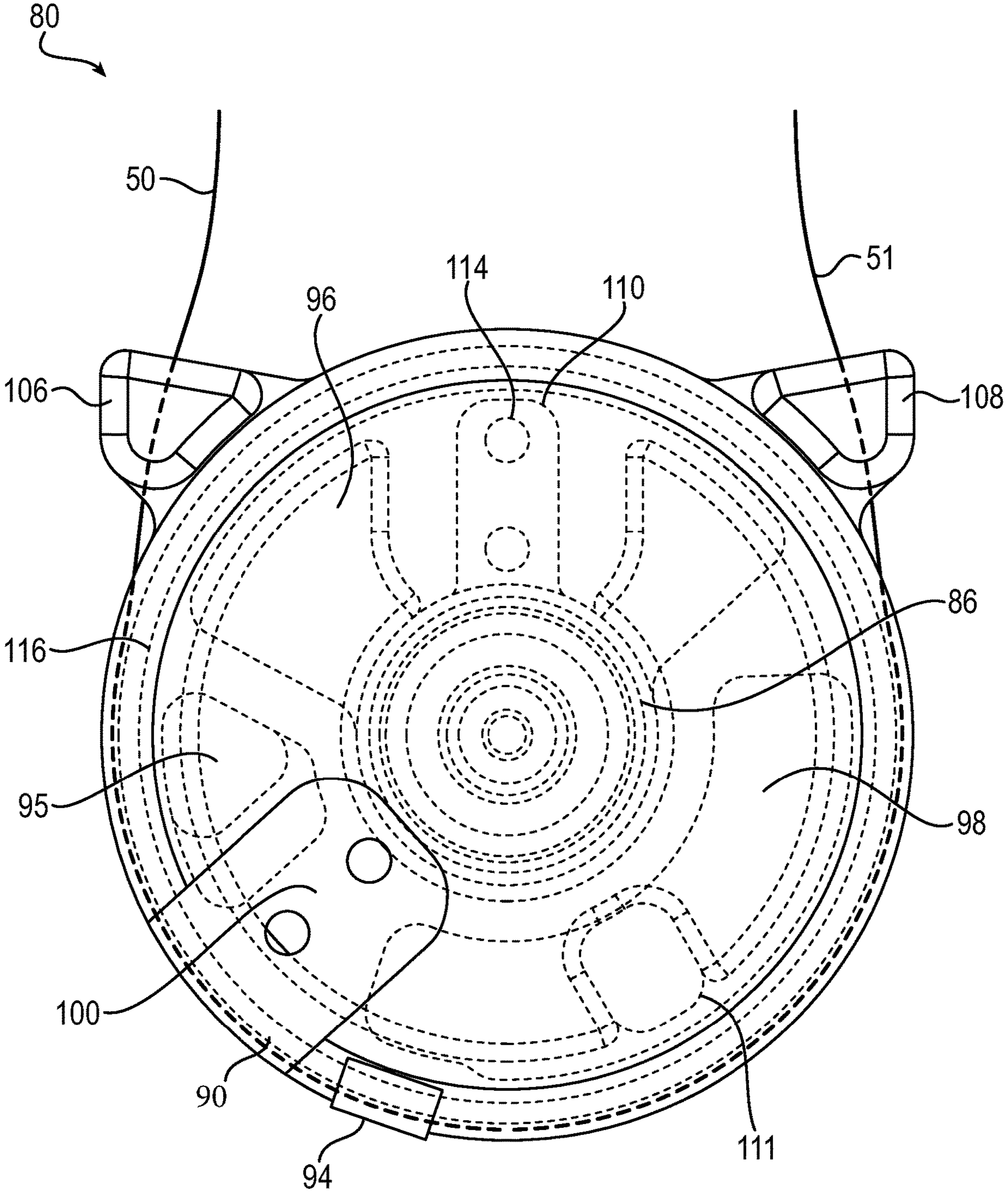
FIG. 23 is a drawing depicting the exemplary driven joint member in an operational configuration.

FIG. 23 is a drawing depicting the exemplary driven joint member in an operational configuration. The driven joint member 80 operates as follows. As referenced above and described in connection with FIGS. 5-9, at a first end cable portions 50 and 51 are inserted into crimp fittings 46 and 48, and the crimp fittings 46 and 48 are crimped about the cable ends so as to provide a secure chain/cable connection with the roller chain 44 of the input portion of the second transmission stage. The transmission cable portions 50 and 51 are then routed through respective opposing Bowden cable sheaths 52 and 54, and the transmission cable portions 50 and 51 are attached to a relatively larger cable pulley to form the output portion of the second stage of speed reduction. The larger cable pulley is formed of the lateral cap 82 and medial cap 84. The cable portions 50 and 51 extend through the cable slot 90 formed around the lateral cap 82, and at second ends opposite from the first ends, the extension cable portion 50 and flexion cable portion 51 are inserted into the additional crimp fitting 94 which secures the second ends of the cable portions 50 and 51. The crimp fitting 94 anchors the cable portions within the cable pulley stage formed by the lateral cap and medial cap. Similarly as with the cable ends at the input portion of the second stage, use of a crimp fitting 94 constitutes an exemplary embodiment, and other configurations of fittings or connections for the cable portion ends may be employed, such as for example swage fittings, welding, castings, and the like.

The motor shaft speed of the motor 18 is reduced through the transmission system 20 as described above. The lateral cap 82 and medial cap 84 cooperatively act as the cable reel output of the transmission system. Generally, because the cable fitting 94 is wider as compared to the cable slot 90, drawing one of the cable portions will cause the lateral cap 82 to be rotated relative to the medial cap 84 by a driving action of the crimp fitting 94 in a direction depending on the direction of rotation, the crimp fitting 94 driving against the surface that defines the cable slot 90.

Accordingly, for extension the extension cable portion 50 is drawn by rotation of the third sprocket 42 such that the lateral cap 82 rotates counter-clockwise relative to the medial cap 84 about the radial bearing 86, which swings the first attachment recess 100 in the counter-clockwise direction. An orthotic joint component that is connected to the first attachment recess would rotate commensurately. For example, if the first attachment recess 100 is connected to a joint bar of the knee joint in a KAFO (or HKAFO) device being worn by a user, the user's knee will extend. Alternatively or additionally, if the first attachment recess 100 is connected to a joint bar of the hip joint in an HKAFO device being worn by a user, the user's hip will extend. Similarly, for flexion the flexion cable portion 51 is drawn by rotation of the third sprocket 42 such that the lateral cap 82 rotates clockwise relative to the medial cap 84 about the radial bearing 86, which swings the first attachment recess 100 in the clockwise direction. If the first attachment recess 100 is connected to a joint bar of the knee joint in a KAFO (or HKAFO) device being worn by a user, the user's knee will flex. Alternatively or additionally, if the first attachment recess 100 is connected to a joint bar of the hip joint in an HKAFO device being worn by a user, the user's hip will flex.

As referenced above, the offset positioning of the first attachment recess 100 and second attachment recess 114 permits the attachment recesses to be rotated past each other, which permits a wide range of motion. In practice, the range of motion is limited by the first range limiting track 96 sliding relative to the first stop block 110, and the second range limiting track 98 sliding relative to the second stop block 111, as the lateral cap 82 rotates relative to the medial cap 84. In other words, the stop blocks 110 and 111 abutting up against either end of the respective range limiting tracks 96 and 98 will preclude additional rotation in the given direction. In the depicted embodiments as illustrative, the range of motion is from 0° extension to 110° of flexion, although larger ranges including even up to and beyond 180° of total rotation are possible by re-configuring the range limiting tracks and stop blocks to accommodate any desired rotational limit.

Because the driven joint member 80 is actuated remotely via the flexible cabling from the rest of the actuator system 10, and remotely from the actuator assembly 12 in particular, the output stage of the transmission system is not required to be axially parallel to the other transmission stages. The use of flexible cabling routed through cable sheaths permits a degree of flexibility in positioning the driven joint member 80 relative to the actuator assembly 12. This allows the full assembly to bend around the contours of the human form, such as the transitions from the thigh to the knee to the lower leg. The driven joint member can be mounted at the joint to be actuated, while keeping the remaining bulk of the actuator system out of the area of movement of the driven joint member. In application, the actuator system would be fastened to any suitable orthosis, which in typical configurations are constructed using standard 3/16"×3/4" stainless steel or aluminum bars for mounting points at each joint, actuating the knee and/or hip on one or both legs.

Figure 24:
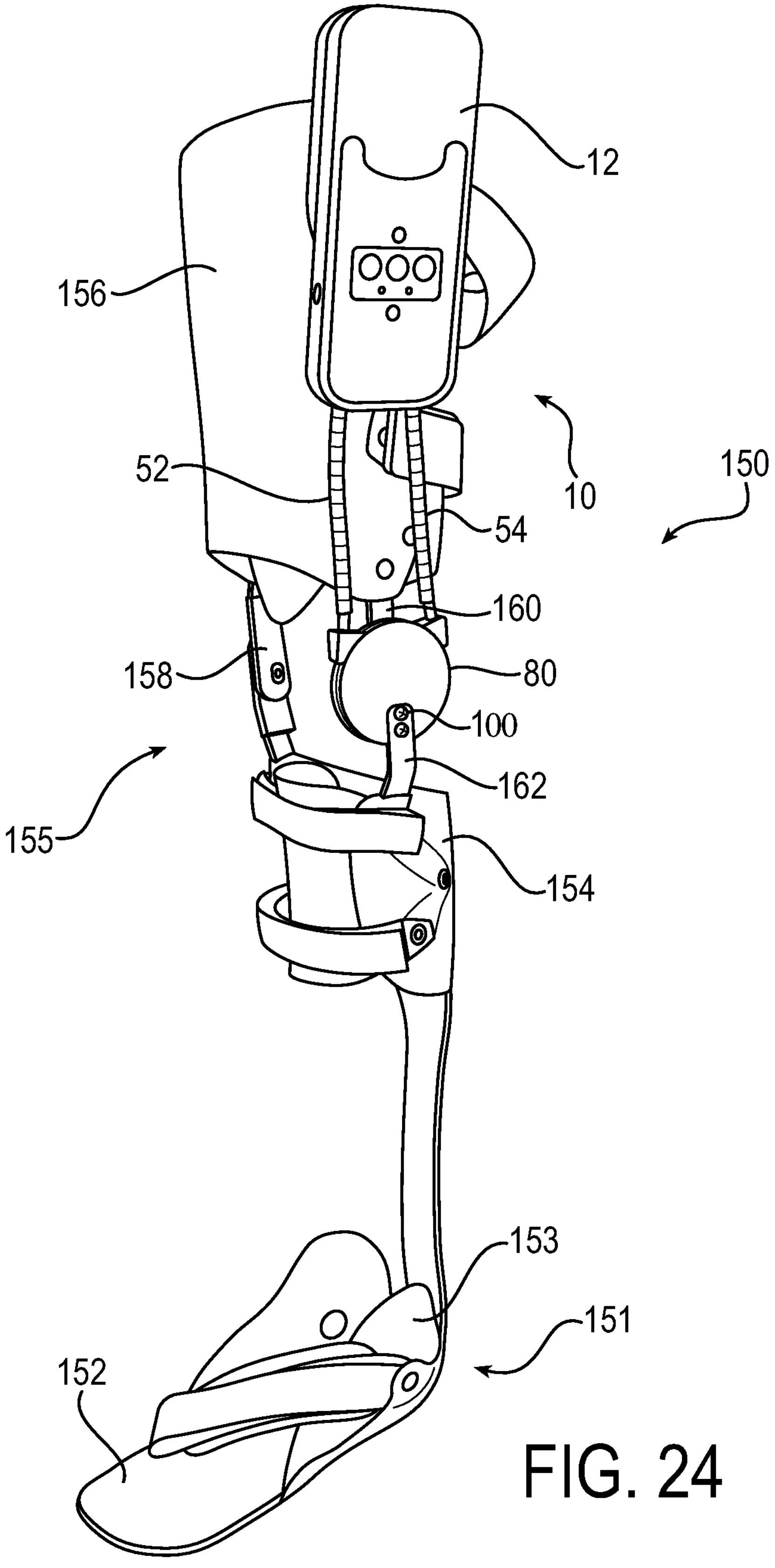
FIG. 24 is a drawing depicting an exemplary knee-ankle-foot orthotic (KAFO) device, which incorporates an actuator system in accordance with embodiments of the present invention.

FIG. 24 is a drawing depicting an exemplary knee-ankle-foot orthotic (KAFO) device 150, which incorporates the actuator system 10 in accordance with embodiments of the present invention. The actuator system 10 may be incorporated into essentially any conventional KAFO device. As is typical, the KAFO device 150 includes an ankle-foot orthosis 151 including a foot plate 152 and an ankle support 153 that can receive the foot of the user (typically including a shoe). The foot plate 152 may operate with a pressure sensor that can detect when the foot plate is on or off of the ground to aid in the gait control. The pressure sensor may be incorporated as part of the foot plate 152, or provided as a separate component that comes in contact with the foot plate 152, for pressure sensing. The pressure sensor may be wired or wirelessly connected to the control electronics of the actuator assembly. The KAFO device 150 further includes a leg brace 155 that includes a calf support 154 and a thigh support 156 that wrap around a user's leg. Such components may be secured to the user using straps that are retained with any suitable mechanical fasteners, such as Velcro®. The leg brace 155 connects the components to each other by arranging the components on a frame 158, typically made of metal such as for example steel, stainless steel, or aluminum. The referenced components form an orthotic brace to provide support for a user during walking.

Generally, the connector component of the driven joint member includes the first attachment recess that is connectable to a first brace component of the orthotic device, and a second attachment recess that is connectable to a second brace component of the orthotic device, whereby operation of the driven joint member rotates the first attachment recess relative to the second attachment recess to operate a joint of the orthotic device. In the example of a KAFO device, the actuator system 10 operates as a powered knee joint. The actuator system 10 is attached with the actuator assembly 12 mounted to the thigh support 156. The cable sheaths 52 and 54 extend downward to the driven joint member 80. The frame 158 includes a first joint bar 160 that extends downward from the thigh support 156, and a second joint bar 162 that extends upward from the calf support 154. The actuator system 10 further is connected to the brace components by connecting the first joint bar 160 of the frame to the second attachment recess 114 (not visible in this view) of the driven joint member 80, and by connecting the second joint bar 162 of the frame to the first attachment recess 100 of the driven joint member 80 such that the driven joint member 80 is positioned at the user's knee during use. As referenced above, the use of Bowden cables routed through cable sheaths permits a degree of flexibility in positioning that allows the full assembly to bend around the contours of the leg. In operation, the actuator assembly drives the driven joint member as described above to provide extension and flexion of the user's knee joint.

Figure 25:
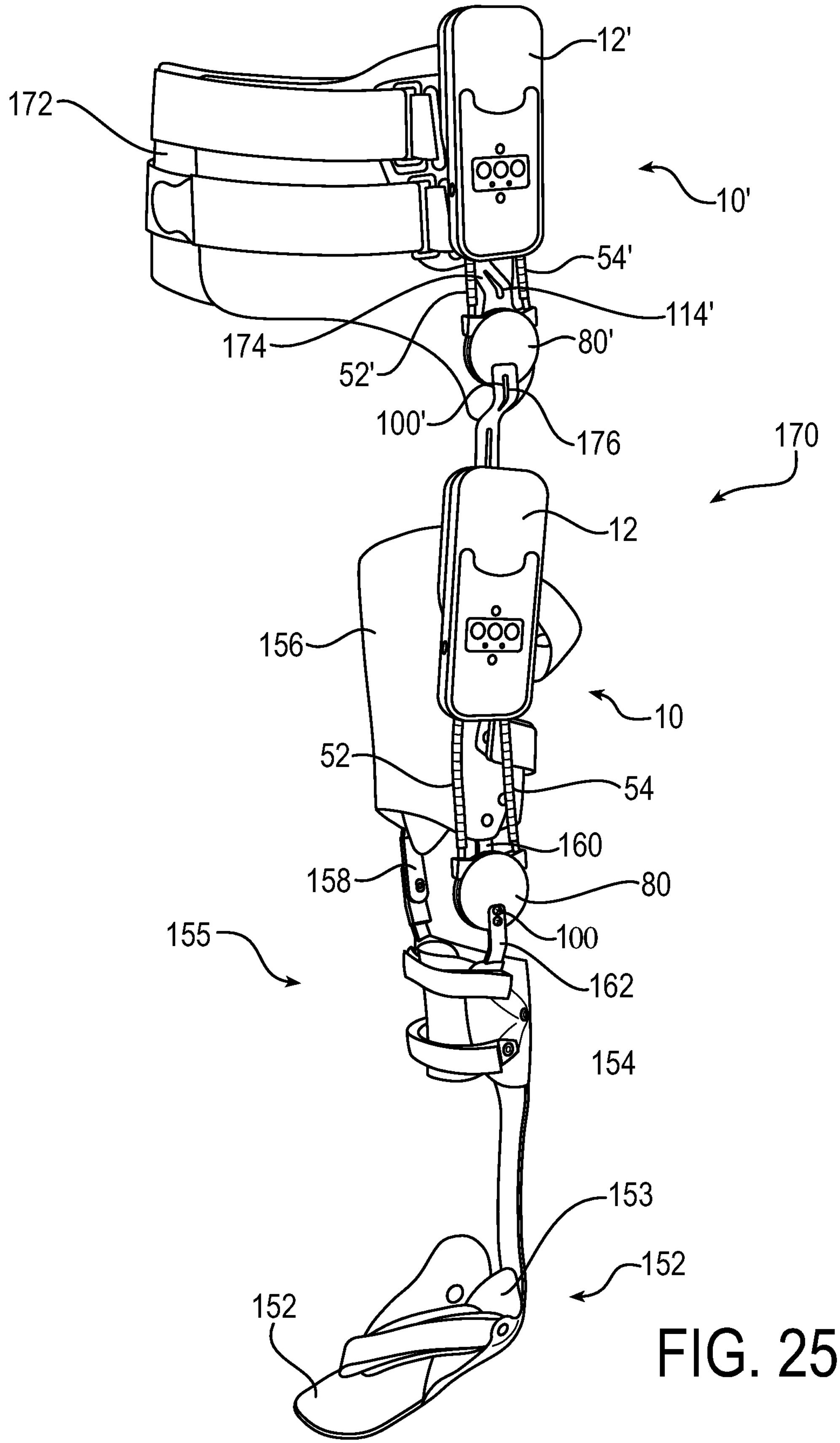
FIG. 25 is a drawing depicting an exemplary hip-knee-ankle-foot orthotic (HKAFO) device, which incorporates a first actuator system and a second actuator system in accordance with embodiments of the present invention.

FIG. 25 is a drawing depicting an exemplary hip-knee-ankle-foot orthotic (HKAFO) device 170, which incorporates a first actuator system 10 and a second actuator system 10' in accordance with embodiments of the present invention. Similarly as above, the actuator systems 10 and 10' may be incorporated into essentially any conventional HKAFO device. As is typical, the HKAFO device generally includes the components of the KAFO device described above. The HKAFO device 170 further includes a torso support 172 that wraps around a user's torso. The torso support 172 also may be secured to the user using straps that are retained with any suitable mechanical fasteners, such as Velcro®. The referenced components form an orthotic brace with added torso support to provide support for a user during walking. In addition, in the example of FIG. 25, the HKAFO device is a unilateral support device including brace components only for one leg (the right leg in this example). In other exemplary embodiments, a bilateral HKAFO device may be provided in which comparable brace components are provided for both legs.

In the example of an HKAFO device, the first actuator system 10 is positioned and operates as a powered knee joint in the manner described above for the KAFO device. In addition, the second actuator system 10' is positioned and operates as a powered hip joint. The second actuator system 10' is attached with the actuator assembly 12' mounted to the torso support 172. The cable sheaths 52' and 54' extend downward to the driven joint 80'. The frame 158 further includes a third joint bar 174 that extends downward from the torso support 172, and a fourth joint bar 176 that extends upward from the thigh support 156. The actuator system 10' further is connected to the brace components by connecting the third joint bar 174 of the frame to the second attachment recess 114' (not visible in this view) of the driven joint member 80', and by connecting the fourth joint bar 176 of the frame to the first attachment recess 100' of the driven joint member 80' such that the driven point member 80' is positioned at the user's hip during use. As referenced above, the use of Bowden cables routed through cable sheaths again permits a degree of flexibility in positioning that allows the full assembly to bend around the contours of the leg. In operation, the first and second actuator assemblies respectively drive both the driven joint members as described above to provide extension and flexion of the user's knee and hip joints. In addition, although the example HKAFO device 170 includes both powered knee and hip joints, one or the other of powered hip versus knee joints may be employed with the HKAFO brace configuration.

The use of the described actuation system has advantages over conventional configurations in that the actuator system can be readily integrated with standard orthotic bracing that is customized to a user body type. Such actuation system provides a smaller and lighter solution for powering wearable orthotic systems, which should also require less torque that is more suitable for orthotic devices. The actuator system configurations address the deficiencies of conventional configurations by minimizing the size of the driven joint, and by allowing the actuator assembly drive unit to be located remotely relative to the driven joint, transmitting power via flexible Bowden cables. With such configuration, varus and valgus angling at the human knee joint and/or hip abduction/adduction in the frontal plane are optimized for walking. The Bowden cable/sheaths configuration of the output of the transmission system permits locating the driven joint member remotely from drive motor and the first transmission stage. This permits the referenced degree of flexibility in positioning the driven joint member so that the actuator system may be integrated into a wide range of customizable orthotic devices, i.e., the actuator system is suitable for use with any standard type bracing as fitted to a given user without the need for additional customization of the actuator system itself.

The actuator system also is back-drivable, meaning that a torque applied at the output driven joint member will cause the transmission, and ultimately the motor, to spin. This back-drivability is significant as it enables cooperative motion when worn by a user who is able to contribute some power for walking via their own muscles. By permitting user contribution to the walking power, the user experiences health benefits of muscle strengthening and ultimately an enhanced gait, characterized by a smoother gait motion and higher efficiency.

As referenced above, in alternative embodiments, a joint control system may include a non-powered motion control unit configured as an intelligent damper or a lock, instead of driving the cables (and thus the orthotic joint) with a motor and through a powered actuator including a transmission. Movement of the cables may be controlled by the motion control unit through damping via a friction brake or other damping source, such as a hydraulic piston and control valve. Alternatively, the motion control unit may include a locking mechanism, controlled by a friction clutch or a positive-engagement lock. A solenoid may be used in such cases to provide the locking. In the case of the damper or the lock mechanism, a transmission may still be employed to increase the effective holding force against cable motion. The damper or lock mechanism provides remote control of an orthotic joint through flexible cabling comparably as in the powered embodiments. Accordingly, the remote control by a joint control system may either be powered actuation, damping, or locking.

An aspect of the invention, therefore, is an enhanced actuator system for an orthotic device that may be incorporated into customized orthotic devices by remotely positioning the driven joint member from the actuator assembly via flexible cabling. In exemplary embodiments, the actuator system includes an actuator assembly and a driven joint member. The actuator assembly includes a motor and a first portion of a transmission assembly that provides a speed reduction of a motor speed to an output speed. The driven joint member includes an output portion of the transmission assembly and a connector component for connecting the driven joint member to a brace component of the orthotic device. The driven joint member including the output portion of the transmission assembly is connected remotely from the actuator assembly by flexible cabling that runs between the actuator assembly and the driven joint member, to permit flexibility in positioning the driven joint member relative to the actuator assembly. The actuator system may include one or more of the following features, either individually or in combination.

In an exemplary embodiment of the actuator system, the driven joint member comprises a lateral cap that is rotatable relative to a medial cap.

In an exemplary embodiment of the actuator system, the lateral cap rotates relative to the medial cap about a radial bearing.

In an exemplary embodiment of the actuator system, the actuator system further includes a thrust bearing configured as a ring positioned between the lateral cap and the medial cap.

In an exemplary embodiment of the actuator system, the actuator system further includes a thrust washer located on an opposite side of the medial cap relative to the thrust bearing.

In an exemplary embodiment of the actuator system, the lateral cap includes a range limiting track and the medial cap includes a stop block that extends into the range limiting track, wherein a rotation of the lateral cap relative to the medial cap is limited by the range limiting track interacting with the stop block.

In an exemplary embodiment of the actuator system, the lateral cap includes a first range limiting track and a second range limiting track, and the medial cap includes a first stop block and a second stop that extend respectively into the first and second range limiting tracks, wherein a rotation of the lateral cap relative to the medial cap is limited by the range limiting tracks interacting with the stop blocks.

In an exemplary embodiment of the actuator system, the lateral cap includes a first attachment recess that is connectable to a first brace component of the orthotic device, and the medial cap includes a second attachment recess that is connectable to a second brace component of the orthotic device, whereby rotation of the lateral cap relative to the medial cap rotates the first attachment recess relative to the second attachment recess to operate a joint of the orthotic device.

In an exemplary embodiment of the actuator system, the actuator system further includes a fastener that extends through the medical cap and is anchored within the lateral cap, wherein the fastener rotates in conjunction with the lateral cap and relative to the medial cap.

In an exemplary embodiment of the actuator system, the medial cap includes a cable port for inserting the flexible cabling into the driven joint member, and the lateral cap includes a cable slot that receives the flexible cabling from the cable port.

In an exemplary embodiment of the actuator system, the flexible cabling extends within the cable slot around the lateral cap and a portion of the flexible cabling are fixed within a fitting located within the lateral cap, and wherein the fitting operates as a driving member that drives rotation of the lateral cap relative to the medial cap.

In an exemplary embodiment of the actuator system, the actuator assembly comprises: a first stage of speed reduction of the transmission assembly connected to an output shaft of the motor for providing a speed reduction of the motor output; and an input portion of a second stage of speed reduction of the transmission assembly linked to an output of the first stage of speed reduction. The driven joint member comprises an output portion of the second stage of speed reduction of the transmission assembly for providing a speed reduction relative to the output of the first stage. The driven joint member including the output portion of the second stage is connected remotely from the actuator assembly by the flexible cabling to permit the flexibility in positioning the driven joint member relative to the actuator assembly.

In an exemplary embodiment of the actuator system, the input portion of the second stage includes a rotating member connected between the output of the first stage and the flexible cabling; the output portion of the second stage includes a cable pulley that receives the flexible cabling; and the cable pulley has a diameter larger than a diameter of the rotating member to form the second stage of speed reduction.

In an exemplary embodiment of the actuator system, the flexible cabling comprises at least one cable that is routed through a cable sheath.

In an exemplary embodiment of the actuator system, the flexible cabling comprises a first cable that is routed through a first cable sheath, and a second cable that is routed through a second cable sheath, wherein the cable sheaths are connected at opposite ends to the actuator assembly and the driven joint member.

In an exemplary embodiment of the actuator system, a first fitting connects a first end of the at least one cable to the actuator assembly, and a second fitting connects an opposing end of the at least one cable.

In an exemplary embodiment of the actuator system, the transmission assembly includes a sprocket and a roller chain that interacts with teeth of the sprocket, and the first and second fittings are located on respective ends of the roller chain to connect the at least one cable to the roller chain.

In an exemplary embodiment of the actuator system, the first stage of speed reduction comprises a first rotating member attached to the output shaft of the motor that transmits power to a second rotating member via a first transmission member, and the second rotating member has a diameter larger than a diameter of the first rotating member to form the first stage of speed reduction.

In an exemplary embodiment of the actuator system, the first transmission member is a chain, and the first and second rotating members are sprockets.

In an exemplary embodiment of the actuator system, the connector component of the driven joint member includes a first attachment recess that is connectable to a first brace component of the orthotic device and a second attachment recess that is connectable to a second brace component of the orthotic device, whereby operation of the driven joint member rotates the first attachment recess relative to the second attachment recess to operate a joint of the orthotic device.

In an exemplary embodiment of the actuator system, the first attachment recess and the second attachment recess are positioned offset relative to each other to enable the first and second attachment recesses to rotate past each other.

Another aspect of the invention is an orthotic device including an orthotic brace system and an actuator system according to any of the embodiments. The actuator assembly of the actuator system is attached remotely from the driven joint member, and the actuator assembly drives the driven joint member to act as a joint of the orthotic bracing system. The orthotic bracing system may be a KAFO device in which the driven joint member acts as the knee joint. The orthotic bracing system may be an HKAFO device in which a first driven joint member of a first actuator system acts as the knee joint, and/or a second driven joint member of a second actuator system acts as a hip joint.

Another aspect of the invention is a driven joint member for use as a joint of an orthotic device. In exemplary embodiments, the joint member includes a lateral cap and a medial cap, wherein: the lateral cap is rotatable relative to a medial cap; the lateral cap includes a first attachment component that is connectable to a first brace component of the orthotic device, and the medial cap includes a second attachment component that is connectable to a second brace component of the orthotic device, whereby rotation of the lateral cap relative to the medial cap rotates the first attachment component relative to the second attachment component to operate a joint of the orthotic device; and the medial cap includes a cable port for inserting flexible cabling into the driven joint member, and the lateral cap includes a cable slot that receives the flexible cabling from the cable port and anchors the flexible cabling within the cable pulley. The driven joint member may include one or more of the following features, either individually or in combination.

In an exemplary embodiment of the driven joint member, the lateral cap rotates relative to the medial cap about a radial bearing.

In an exemplary embodiment of the driven joint member, the driven joint member further includes a thrust bearing configured as a ring positioned between the lateral cap and the medial cap.

In an exemplary embodiment of the driven joint member, the driven joint member further includes a thrust washer located on an opposite side of the medial cap relative to the thrust bearing.

In an exemplary embodiment of the driven joint member, the lateral cap includes a range limiting track and the medial cap includes a stop block that extends into the range limiting track, wherein a rotation of the lateral cap relative to the medial cap is limited by the range limiting track interacting with the stop block.

In an exemplary embodiment of the driven joint member, the lateral cap includes a first range limiting track and a second range limiting track, and the medial cap includes a first stop block and a second stop that extend respectively into the first and second range limiting tracks, wherein a rotation of the lateral cap relative to the medial cap is limited by the range limiting tracks interacting with the stop blocks.

In an exemplary embodiment of the driven joint member, the lateral cap includes a first attachment recess that is connectable to a first brace component of the orthotic device, and the medial cap includes a second attachment recess that is connectable to a second brace component of the orthotic device, whereby rotation of the lateral cap relative to the medial cap rotates the first attachment recess relative to the second attachment recess to operate a joint of the orthotic device.

In an exemplary embodiment of the driven joint member, the driven joint member further includes a fastener that extends through the medical cap and is anchored within the lateral cap, wherein the fastener rotates in conjunction with the lateral cap and relative to the medial cap.

In an exemplary embodiment of the driven joint member, the medial cap includes a cable port for inserting the flexible cabling into the driven joint member, and the lateral cap includes a cable slot that receives the flexible cabling from the cable port.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator system for an orthotic device, the actuator system comprising:

a transmission assembly;

an actuator assembly comprising a motor and a first portion of the transmission assembly that provides a speed reduction of a motor speed to an output speed;

a driven joint member comprising an output portion of the transmission assembly and a connector component for connecting the driven joint member to a brace component of the orthotic device, wherein the output portion rotates the connector component to drive rotation of the brace component;

flexible cabling that flexibly connects the driven joint member to the actuator assembly, wherein the driven joint member including the output portion of the transmission assembly is connected remotely from the actuator assembly by the flexible cabling that runs between the actuator assembly and the driven joint member, to permit flexibility in positioning the driven joint member relative to the actuator assembly; and a housing that houses the actuator assembly, wherein the housing including the actuator assembly is wearable by a user;

wherein:

the driven joint member comprises an output section of the transmission assembly that includes a cable pulley that receives at least one cable of the flexible cabling;

the transmission assembly further includes a sprocket and a roller chain that interacts with teeth of the sprocket, and at least one fitting is on an end of the roller chain to connect the at least one cable to the roller chain; and the sprocket has a diameter that is smaller than a diameter of the cable pulley to provide speed reduction of the cable pulley relative to the sprocket.

2. The actuator system of claim 1, wherein the driven joint member comprises a lateral cap that is rotatable relative to a medial cap.

3. The actuator system of claim 2, wherein the lateral cap rotates relative to the medial cap about a radial bearing.

4. The actuator system of claim 3, further comprising a thrust bearing configured as a ring positioned between the lateral cap and the medial cap.

5. The actuator system of claim 4, further comprising a thrust washer located on an opposite side of the medial cap relative to the thrust bearing.

6. The actuator system of claim 2, wherein the lateral cap includes a range limiting track and the medial cap includes a stop block that extends into the range limiting track, wherein a rotation of the lateral cap relative to the medial cap is limited by the range limiting track interacting with the stop block.

7. The actuator system of claim 2, wherein the lateral cap includes a first range limiting track and a second range limiting track, and the medial cap includes a first stop block and a second stop that extend respectively into the first and second range limiting tracks, wherein a rotation of the lateral cap relative to the medial cap is limited by the range limiting tracks interacting with the stop blocks.

8. The actuator system of claim 2, wherein the brace component comprises a first brace component and a second brace component, and wherein the lateral cap includes a first attachment recess that is connectable to the first brace component, and the medial cap includes a second attachment recess that is connectable to the second brace component, whereby the output portion drives rotation of the lateral cap relative to the medial cap and rotation of the lateral cap relative to the medial cap rotates the first attachment recess relative to the second attachment recess to operate a joint of the orthotic device.

9. The actuator system of claim 2, wherein the medial cap includes a cable port for inserting the flexible cabling into the driven joint member, and the lateral cap includes a cable slot that receives the flexible cabling from the cable port.

10. The actuator system of claim 9, wherein the flexible cabling extends within the cable slot around the lateral cap and a portion of the flexible cabling is fixed within a fitting located within the lateral cap, and wherein the fitting operates as a driving member that drives rotation of the lateral cap relative to the medial cap.

11. The actuator system of claim 1, wherein:

the transmission assembly comprises:

a first stage of speed reduction connected to an output shaft of the motor for providing a speed reduction of the motor output; and an input portion of a second stage of speed reduction comprising the sprocket linked to an output of the first stage of speed reduction;

the output section comprising an output portion of the second stage of speed reduction of the transmission assembly for providing a speed reduction relative to the output of the first stage; and the driven joint member including the output section portion of the second stage is connected remotely from the actuator assembly by the flexible cabling to permit the flexibility in positioning the driven joint member relative to the actuator assembly.

12. The actuator system of claim 11, wherein:

the input portion of the second stage includes the sprocket connected between the output of the first stage and the flexible cabling;

the output portion of the second stage includes the cable pulley that receives the flexible cabling; and the cable pulley having the diameter larger than the diameter of the sprocket forms the second stage of speed reduction.

13. The actuator system of claim 1, wherein the at least one cable that is routed through a cable sheath.

14. The actuator system of claim 13, wherein the at least one fitting comprises a first fitting that connects a first end of the at least one cable to the actuator assembly, and a second fitting that connects an opposing end of the at least one cable.

15. The actuator system of claim 1, wherein the at least one cable comprises a first cable that is routed through a first cable sheath, and a second cable that is routed through a second cable sheath, wherein the cable sheaths are connected at opposite ends to the actuator assembly and the driven joint member.

16. The actuator system of claim 1, wherein the connector component of the driven joint member includes a first attachment recess that is connectable to a first brace component of the orthotic device and a second attachment recess that is connectable to a second brace component of the orthotic device, whereby operation of the driven joint member rotates the first attachment recess relative to the second attachment recess to operate a joint of the orthotic device.

17. The actuator system of claim 16, wherein the first attachment recess and the second attachment recess are positioned offset relative to each other to enable the first and second attachment recesses to rotate past each other.

18. An orthotic device comprising:

a knee-ankle-foot orthosis (KAFO) brace; and the actuator system according to claim 1;

wherein the actuator assembly of the actuator system is attached to a thigh support of the KAFO brace, and the driven joint member acts a knee joint of the KAFO brace.

19. An orthotic device comprising:

a hip-knee-ankle-foot orthosis (HKAFO) brace;

a first actuator system comprising the actuator system according to claim 1;

wherein the actuator assembly of the first actuator system is attached to a thigh support of the HKAFO brace, and the driven joint member of the first actuator system acts a knee joint of the HKAFO brace; and/or a second actuator system comprising the actuator system according to claim 1;

wherein the actuator assembly of the second actuator system is attached to a torso support of the HKAFO brace, and the driven joint member of the second actuator system acts a hip joint of the HKAFO brace.

* * * * *